US011474408B2

(12) United States Patent
Takahashi et al.

(10) Patent No.: US 11,474,408 B2
(45) Date of Patent: Oct. 18, 2022

(54) ELECTRONIC DEVICE, METHOD FOR PRODUCING ELECTRONIC DEVICE, AND PHOTOCHROMATIC LENS UNIT

(71) Applicant: Ricoh Company, Ltd., Tokyo (JP)

(72) Inventors: Yasuhiro Takahashi, Kanagawa (JP); Keiichiroh Yutani, Kanagawa (JP); Tohru Yashiro, Kanagawa (JP); Tomoo Fukuda, Tokyo (JP); Kohji Takeuchi, Kanagawa (JP); Tohru Hasegawa, Kanagawa (JP); Koh Fujimura, Tokyo (JP); Takashi Tsutsui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 157 days.

(21) Appl. No.: 16/821,521

(22) Filed: Mar. 17, 2020

(65) Prior Publication Data

US 2020/0301227 A1 Sep. 24, 2020

(30) Foreign Application Priority Data

| Mar. 19, 2019 | (JP) | JP2019-051209 |
| Mar. 20, 2019 | (JP) | JP2019-053853 |
| Mar. 3, 2020 | (JP) | JP2020-036142 |

(51) Int. Cl.
*G02F 1/155* (2006.01)
*G02C 7/10* (2006.01)

(52) U.S. Cl.
CPC .............. *G02F 1/155* (2013.01); *G02C 7/101* (2013.01)

(58) Field of Classification Search
CPC ............................... G02F 1/155; G02C 7/101
See application file for complete search history.

(56) References Cited

U.S. PATENT DOCUMENTS

| 4,702,566 A | * | 10/1987 | Tukude | G02F 1/1533 |
| | | | | 359/267 |
| 5,657,150 A | * | 8/1997 | Kallman | G02C 7/101 |
| | | | | 351/49 |
| 6,001,487 A | | 12/1999 | Ladang et al. | |
| 10,495,937 B2 | | 12/2019 | Yashiro et al. | |
| 10,509,290 B2 | | 12/2019 | Kim et al. | |
| 2005/0275923 A1 | * | 12/2005 | Park | G02F 1/155 |
| | | | | 359/270 |
| 2009/0303565 A1 | * | 12/2009 | Karmhag | G02F 1/1533 |
| | | | | 359/265 |

(Continued)

FOREIGN PATENT DOCUMENTS

| EP | 0 356 099 A2 | 2/1990 |
| JP | 07209677 A * | 8/1995 |

(Continued)

OTHER PUBLICATIONS

Extended European Search Report dated May 18, 2020 in Patent Application No. 20163776.6, 15 pages.

*Primary Examiner* — George G. King
(74) *Attorney, Agent, or Firm* — Xsensus LLP

(57) ABSTRACT

An electronic device includes electrode layers and supports. The electrode layers and supports include an electrode layer and a support on each of both sides of an electronic functional layer in a thickness direction. Taking-out electrode parts from the electrode layers are exposed in a plane region of at least one of the supports on the both sides.

4 Claims, 13 Drawing Sheets

(56) References Cited

U.S. PATENT DOCUMENTS

| | | | |
|---|---|---|---|
| 2009/0323162 A1* | 12/2009 | Fanton | G02F 1/1533 |
| | | | 359/275 |
| 2013/0286458 A1* | 10/2013 | Lamine | G02F 1/155 |
| | | | 359/265 |
| 2014/0055836 A1 | 2/2014 | Cammenga et al. | |
| 2015/0077828 A1 | 3/2015 | Kukita | |
| 2015/0251604 A1* | 9/2015 | Kukita | G02F 1/157 |
| | | | 359/266 |
| 2018/0017835 A1 | 1/2018 | Kim et al. | |
| 2018/0299740 A1 | 10/2018 | Takeuchi et al. | |
| 2019/0041712 A1* | 2/2019 | Liu | G02F 1/1525 |
| 2019/0184694 A1 | 6/2019 | Yashiro et al. | |
| 2019/0227401 A1 | 7/2019 | Yutani et al. | |
| 2019/0285960 A1 | 9/2019 | Sasa et al. | |

FOREIGN PATENT DOCUMENTS

| | | |
|---|---|---|
| JP | 2015-94924 A | 5/2015 |
| JP | 2016-105150 | 6/2016 |
| JP | 2016-133610 | 7/2016 |
| JP | 2016-148805 | 8/2016 |
| JP | 2018-132635 | 8/2018 |
| WO | WO 2014/134714 A2 | 9/2014 |
| WO | 2017/104466 | 6/2017 |

\* cited by examiner

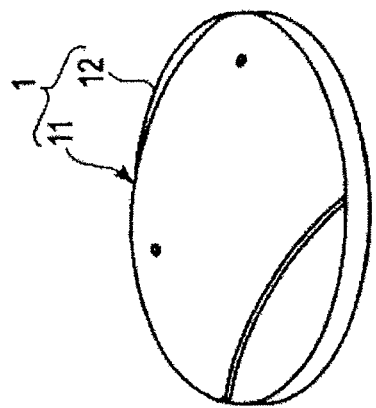
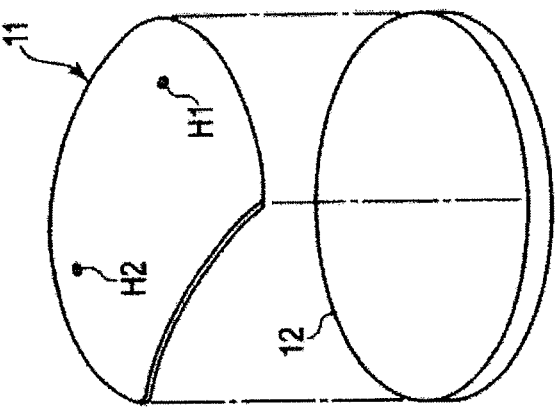
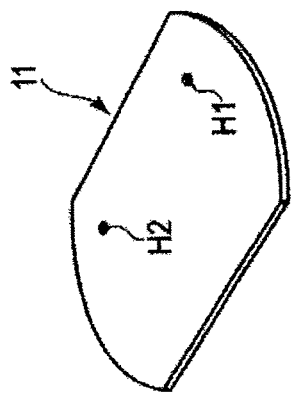
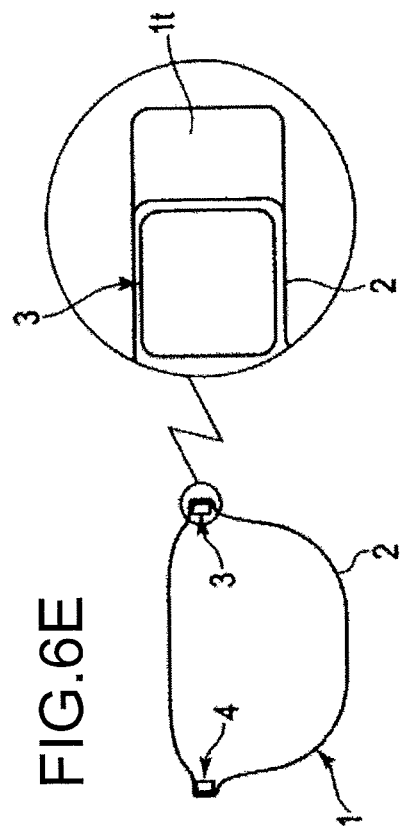
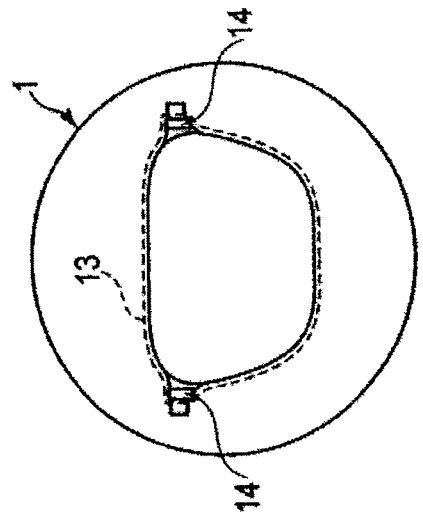

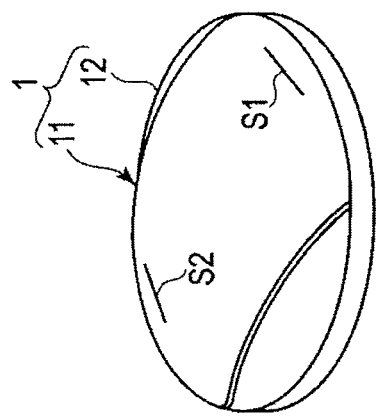
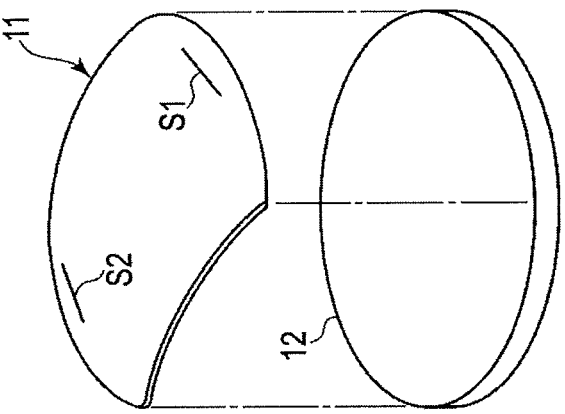
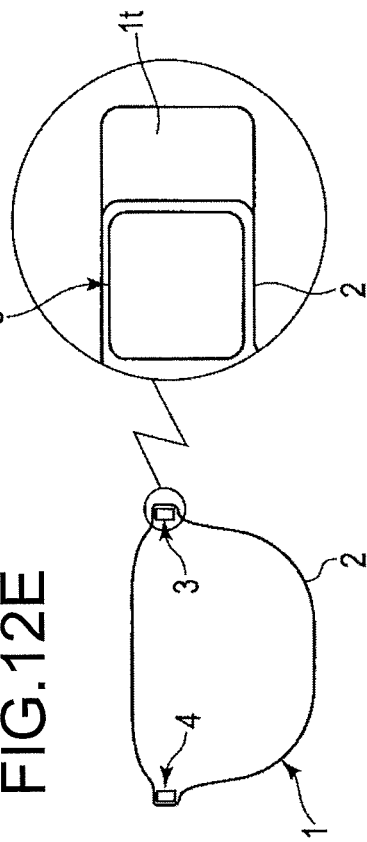
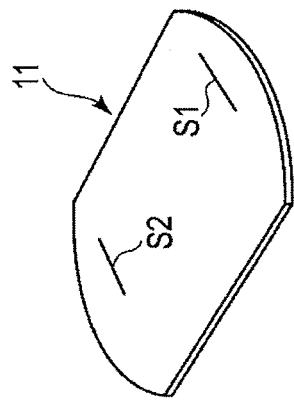
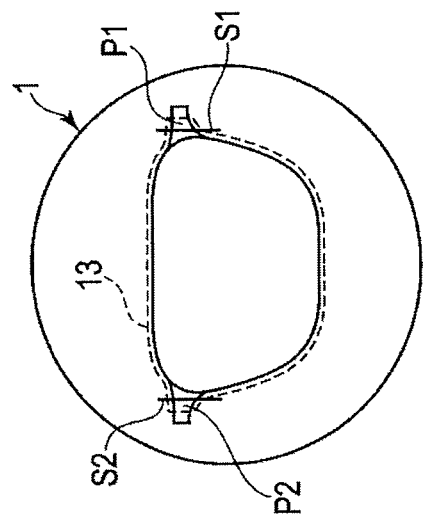

ELECTRONIC DEVICE, METHOD FOR PRODUCING ELECTRONIC DEVICE, AND PHOTOCHROMATIC LENS UNIT

CROSS-REFERENCE TO RELATED APPLICATIONS

The present application claims priority under 35 U.S.C. § 119 to Japanese Patent Application No. 2019-051209, filed on Mar. 19, 2019, Japanese Patent Application No. 2019-053853, filed on Mar. 20, 2019, and Japanese Patent Application No. 2020-036142, filed on Mar. 3, 2020. The contents of which are incorporated herein by reference in their entirety.

BACKGROUND OF THE INVENTION

1. Field of the Invention

The present invention relates to an electronic device, a method for producing the electronic device, and a photochromatic lens unit.

2. Description of the Related Art

Conventionally, an electronic device including an electrode layer and a support on each of both sides in a thickness direction of an electronic functional layer, in which taking-out electrode parts from each of the electrode layers are exposed to an outer surface has been known.

For example, Japanese Unexamined Patent Application Publication No. 2018-132635 and WO 17/104466 A1 have disclosed an electrochromic technology that provides this type of the electronic device formed by combining an electrochromic element having an electrochromic layer serving as an electronic functional layer and an optical lens. In particular, Japanese Unexamined Patent Application Publication No. 2018-132635 has disclosed an electronic device in which the resistance of the connection to a power source and a driving circuit is made low by using a taking-out electrode for a part of the electrode in the electrochromic device to stabilize electrical connection to the power source and the driving circuit in the electrochromic device.

SUMMARY OF THE INVENTION

According to an aspect of the present invention, an electronic device includes electrode layers and supports. The electrode layers and supports include an electrode layer and a support on each of both sides of an electronic functional layer in a thickness direction. Taking-out electrode parts from the electrode layers are exposed in a plane region of at least one of the supports on the both sides.

BRIEF DESCRIPTION OF THE DRAWINGS

FIGS. 6A to 6E are views illustrating a method for producing an electrochromic device (photochromatic lens unit) according to the first embodiment, FIG. 6A is a view of a preparation process, FIG. 6B is a view of a thermoforming process, FIG. 6C is a view of a bonding process, FIG. 6D is a view of a processing process, and FIG. 6E is a completion view;

FIGS. 12A to 12E are views illustrating a method for producing an electrochromic device (photochromatic lens unit) according to the second embodiment, FIG. 12A is a view of a preparation process, FIG. 12B is a view of a thermoforming process, FIG. 12C is a view of a bonding process, FIG. 12D is a view of a processing process, and FIG. 12E is a completion view;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
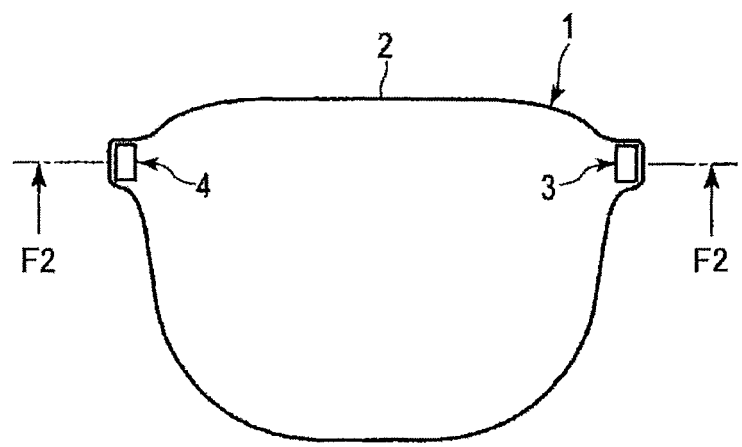
FIG. 1 is a plan view of the photochromatic lens unit according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to more stabilize electric connection to achieve operation stability and power saving.

"First Embodiment"

Embodiments will be described in which the present invention is applied to an electronic device, that is, the electrochromic device, in which an electronic functional layer is an electrochromic layer. The electrochromic layer is one example of the electronic functional layer and the present invention can be applied to an electronic device including other electronic functional layers.

FIG. 1 is a configuration view of the photochromatic lens unit 1 (the electrochromic device) according to the first embodiment. As illustrated in FIG. 1, the photochromatic lens unit 1 includes a photochromatic lens body 2 and a pair of electrode taking-out parts (a first electrode taking-out part 3 and a second electrode taking-out part 4). The electrode taking-out part is an exposed part of the taking-out electrode part described below at the outer surface. The photochromatic lens body 2 is provided between the electrode taking-out parts 3 and 4 and is configured to be capable of changing the transmittance of light.

In the example in FIG. 1, the photochromatic lens body 2 has a profile in which both ends of the upper part protrude outward and the electrode taking-out parts 3 and 4 extend one by one at these protruded parts in a plane shape. As the pair of the protruded parts, for example, a part connected to a temple of a spectacle frame and a part connected to a bridge are assumed.

Figure 2:
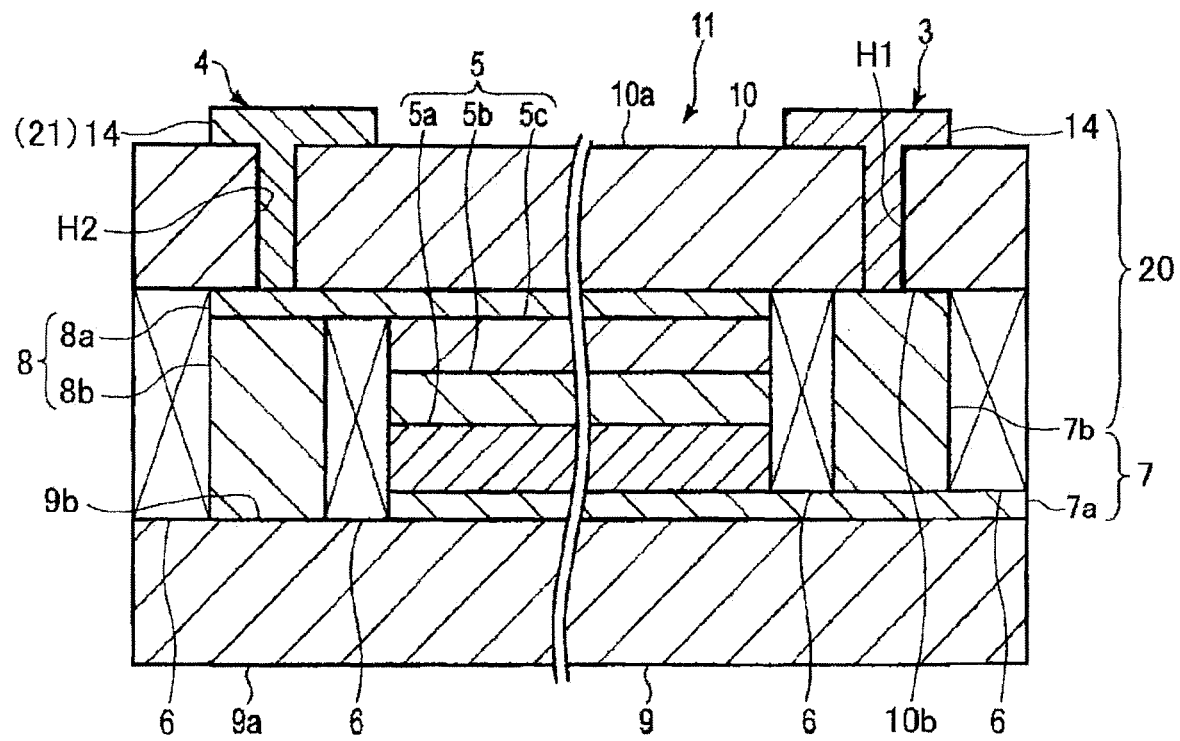
FIG. 2 is a sectional view taken from line F2-F2 of FIG. 1.

FIG. 2 is a sectional view of the electrochromic element 11 serving as the main component of the photochromatic lens unit 1 (the photochromatic lens body 2) as the electrochromic device. The electrochromic element 11 is a substance utilizing a phenomenon (electrochromism) in which oxidation-reduction reaction reversibly occurs by applying voltage to reversibly change color. The electrochromic element 11 (the photochromatic lens body 2) includes an intermediate part 5, an adhesion layer 6, a pair of electrode layers (a first electrode 7a and a second electrode 8a), and a pair of plate-like supports (a first support 9 and a second support 10). The electrochromic element 11 also further includes the electrode taking-out parts 3 and 4 described above and a pair of taking-out electrode parts (a first taking-out electrode part 20 and a second taking-out electrode part 21) electrically connected one by one to a pair of the electrode layers (the first electrode layer 7a and the second electrode layer 8a), respectively.

The electrode layers 7a and 8a are adjacently arranged at both sides in the thickness direction of the intermediate part 5 described below. The supports 9 and 10 include outer surfaces 9a and 10a and inner surfaces 9b and 10b and are adjacently arranged at both sides in the thickness direction of the electrode layers 7a and 8a. In this case, the inner surfaces 9b and 10b of the supports 9 and 10 are adjacent to the electrode layers 7a and 8a.

Both of the pair of the taking-out electrode parts (the first taking-out electrode part 20 and the second taking-out electrode part 21) are exposed to outside through one of the supports (that is, the second support 10). The other taking-out electrode part (for example, the first taking-out electrode part 20) includes a first penetration structure H1. The first penetration structure H1 extends by penetrating from the outer surface 10a to the inner surface 10b of the second support 10. The first penetration structure H1 reaches one of the electrode layers (for example, the first electrode layer 7a) while avoiding the other electrode layer (for example, the second electrode layer 8a) and the taking-out electrode part (for example, the second taking-out electrode part 21).

Here, the first penetration structure H1 is a through hole penetrating the second support 10 from the outer surface 10a to the inner surface 10b. The first electrode taking-out part 3 is configured by extending a conductive material 14 filled in the through hole (the first penetration structure H1) in a plane shape along the outer surface 10a of the second support 10. The conductive material 14 filled in the through hole (the first penetration structure H1) reaches a first contact layer 7b made of a conductive material having the approximately same layer thickness as the thickness of the intermediate part 5 stacked on the first electrode layer 7a. In this way, the first electrode taking-out part 3 is electrically connected to the first electrode layer 7a. The part made of the conductive material 14 and the first contact layer 7b configure the first taking-out electrode part. The first electrode layer 7a and the first contact layer 7b are recognized as an electrically integrated electrode together with the first electrode layer 7a existing approximately in the layer thickness of the intermediate part 5 between the supports 9 and 10 and have stacking relation at production. Therefore, the first electrode layer 7a and the first contact layer 7b together with each other are referred to as the first electrode part 7.

The other taking-out electrode part (for example, the second taking-out electrode part 21) includes a second penetration structure H2. The second penetration structure H2 extends by penetrating from the outer surface 10a to the inner surface 10b of the second support 10. The second penetration structure H2 reaches the other electrode layer (for example, the second electrode layer 8a) while avoiding one of the electrode layers (for example, the first electrode layer 7a) and the first taking-out electrode part 20.

Here, the second penetration structure H2 is a through hole penetrating the second support 10 from the outer surface 10a to the inner surface 10b. The second electrode taking-out part 4 is configured by extending the conductive material 14 filled in the through hole (the second penetration structure H2) in a plane shape along the outer surface 10a of the second support 10. The conductive material 14 filled in the through hole (the second penetration structure H2) reaches the second electrode layer 8a. In this way the second electrode taking-out part 4 is electrically connected to the second electrode layer 8a. The part made of the conductive material 14 configures the second taking-out electrode part 21. On the second electrode layer 8a, the second contact layer 8b made of the conductive material having the approximately same layer thickness as the thickness of the intermediate part 5 is stacked between the second contact layer 8b and the support 9. The second electrode layer 8a and the second contact layer 8b are recognized as an electrically integrated electrode together with the second electrode layer 8a existing approximately in the layer thickness of the intermediate part 5 between the supports 9 and 10 and have stacking relation at production. Therefore, the second electrode layer 8a and the second contact layer 8b together with each other are referred to as the second electrode part 8.

As the conductive material 14, for example, a conductive resin material or a metal material selected from the group consisting of Au, Ag, Al, Sn, Zn, Zr, Ge, Pt, Rd, Ni, W, Pd, Cr, Mo, Rh, and the like can be applied. The configuration of the electrode taking-out parts 3 and 4 using these materials allows the electrical connection to the power source and the driving circuit to be stabilized.

Here, voltage is applied between the electrode parts 7 and 8 through the electrode taking-out parts 3 and 4. This voltage application allows reversible oxidation-reduction reaction to occur in the electrochromic element 11. At this time, the color of the photochromatic lens body 2 (in other words, the transmittance of light) is reversibly changed. This allows the color of the photochromatic lens body 2 to be developed depending on the sense and use purpose of users or use the environment of the photochromatic lens unit 1.

The intermediate part 5 described above includes an electrochromic layer 5a, an electrolyte layer 5b, and a deterioration prevention layer 5c.

"Electrochromic layer 5a in intermediate part 5"

The electrochromic layer 5a includes an electrochromic material and further includes other components, if necessary. As the electrochromic material, both inorganic electrochromic compounds and organic electrochromic compounds are applicable. As the electrochromic material, conductive polymers that are known for indicating electrochromism described above may be used.

Examples of the inorganic electrochromic compounds include tungsten oxide, molybdenum oxide, iridium oxide, and titanium oxide. Examples of the organic electrochromic compounds include viologen, rare earth phthalocyanine, and styryl. Examples of the conductive polymers include polypyrrole, polythiophene, polyaniline, and derivatives thereof.

As the electrochromic layer 5a, a structure in which the organic electrochromic compound is supported on conductive or semi-conductive fine particles is preferable. Specifically, the structure is a structure in which fine particles having a particle diameter of about 5 nm to about 50 nm are sintered on the electrode surface and the organic electrochromic compound having a polar group such as phosphonic acid, a carboxyl group, and a silanol group is adsorbed on the surface of the fine particles.

In such a structure, electrons are efficiently injected into the organic electrochromic compound by utilizing the large surface effect of the fine particles. Consequently, this electrochromic element can be responded faster as compared with conventional electrochromic display elements. In addition, a transparent film serving as a display layer can be formed by using the fine particles and thus high coloring density of the electrochromic pigment can be obtained. A plurality of types of the organic electrochromic compounds may be supported onto the conductive or semi-conductive fine particles.

Specific examples of the electrochromic material described above include polymer-based and die-based electrochromic compounds such as low molecular weight organic electrochromic compound including azobenzene-based, anthraquinone-based, diarylethene-based, dihydroprene-based, dipyridine-based, styryl-based, styrylspiropyran-based, spirooxazine-based, spirothiopyran-based, thioindigo-based, tetrathiafulvalene-based, terephthalic acid-based, triphenylmethane-based, triphenylamine-based, naphthopyran-based, viologen-based, pyrazoline-based, phenazine-based, phenylenediamine-based, phenoxazine-based, phenothiazine-based, phthalocyanine-based, fluoran-based, fulgide-based, benzopyran-based, and metallocene-based compounds and conductive polymer compounds such as polyaniline and polythiophene.

These electrochromic materials may be used singly or in combination of two or more of them. Of these electrochromic materials, the viologen-based compound and the dipyridine-based compound are preferable from the viewpoint of low voltage for color development and reduction and excellent color value indication. Examples of the viologen-based compound include compounds described in Japanese Patent No. 3955641 and Japanese Unexamined Patent Application Publication No. 2007-171781. Examples of the dipyridine-based compound include compounds described in Japanese Unexamined Patent Application Publication No. 2007-171781 and Japanese Unexamined Patent Application Publication No. 2008-116718.

Of these compounds, the dipyridine-based compound represented by the following general formula (1) is preferable from the viewpoint of exhibiting the excellent color value of color development.

[Chemical Formula 1]

General Formula (1)

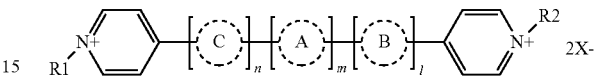

In the general formula (1) described above, R1 and R2 each independently represent an alkyl group having a carbon number of 1 to 8 or an aryl group and optionally having a substituent. At least one of R1 and R2 has a substituent selected from COOH, PO(OH)$_2$, and Si(OC$_k$H$_{2k+1}$)$_3$ (where k is 1 to 20).

In the general formula (1) described above, X represents a monovalent anion. The anion is not particularly limited as long as the anion stably forms a pair with a cation part. Examples of the anion include a Br ion (Br—), a Cl ion (Cl—), a ClO$_4$ ion (ClO$_4$—), a PF$_6$ ion (PF$_6$—), and a BF$_4$ ion (BF$_4$—). n, m, and l represent 0, 1, or 2. A, B, and C each independently represent an alkyl group, an aryl group, or a heterocyclic group having a carbon number of 1 to 20 and optionally having a substituent.

As the metal complex and metal oxide electrochromic compound, inorganic electrochromic compounds such as titanium oxide, vanadium oxide, tungsten oxide, indium oxide, iridium oxide, nickel oxide, and Prussian blue. The conductive or semi-conductive fine particles supporting the electrochromic compound described above are not particularly limited and can be appropriately selected depending on the purpose. The metal oxide is preferable.

As the materials for the metal oxides described above, metal oxides including titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicic acid, calcium phosphate, or aluminosilicates as the main component are used.

These metal oxide materials may be used singly or in combination of two or more of them. Of these metal oxide, when one metal oxide selected from titanium oxide, zinc oxide, tin oxide, zirconium oxide, iron oxide, magnesium oxide, indium oxide, and tungsten oxide or a mixture thereof is used, color display having excellent response speed of developing and reducing color is possible in view of electric properties such as electric conductivity and physical properties such as optical properties. In particular, the color display having more excellent response speed of the developing and reducing color is possible when titanium oxide is used.

The shape of the conductive and semi-conductive fine particles is not particularly limited. To efficiently support the electrochromic compound, a shape having a large surface area per unit volume (hereinafter, referred to as a specific surface area) is used. For example, in the case where the fine particles are the agglomerate of nano-particles, the electrochromic compound can be more efficiently supported because the nano-particles have a large specific surface area. Therefore, the display contrast ratio of color development and reduction is excellent.

The thickness of the electrochromic layer 5a described above is not particularly limited and can be appropriately selected depending on the purpose. The thickness is preferably 0.2 µm to 5.0 µm. In this case, the electrochromic layer 5a having a thickness of less than 0.2 µm may cause difficulty in obtaining coloring density, whereas the electrochromic layer 5a having a thickness of more than 5.0 µm may result in increasing production cost and may tend to lower the visibility due to coloring. The electrochromic layer 5a and the conductive and semi-conductive fine particle layer may be formed by vacuum film formation. However, these layers are preferably formed by coating application using a particle dispersion paste from the viewpoint of productivity.

"Electrolyte layer 5b in intermediate part 5"

The electrolyte layer 5b is preferably a solid electrolyte layer. The electrolyte layer 5b, however, is not limited and may be a semisolid state and a liquid state. In the case of the solid electrolyte layer, for example, the electrolyte layer 5b is formed as a film in which the electrolyte is retained in a light curable resin or a thermosetting resin.

In the electrolyte layer 5b, inorganic fine particles controlling the layer thickness of the electrolyte layer 5b are preferably mixed. As the thickness of the electrolyte layer 5b, excessively thin thickness increases the possibility of leakage and excessively thick thickness results in reducing a reaction rate. Consequently, the thickness of the electrolyte layer 5b is preferably 5 µm to 200 µm and further preferably 20 µm to 150 µm.

The electrolyte layer 5b is preferably formed as a film by applying a solution in which the inorganic fine particles, the curable resin, and the electrolyte are mixed onto the electrochromic layer 5a and thereafter curing the film by light or heat. Other methods may also be applicable. For example, the film may be formed by previously forming a porous inorganic fine particle layer, thereafter applying the solution in which the curable resin and the electrolyte are mixed so that the solution is permeated into the inorganic layer, and thereafter curing the film by light or heat. In the case where the electrochromic layer 5a is a layer in which the electrochromic compound is supported by the conductive or semi-conductive nano-particles, the film may be formed by applying the solution in which the curable resin and the electrolyte are mixed so that the solution is permeated into the electrochromic layer 5a, and thereafter curing the film by light or heat.

As the electrolyte described above, a liquid electrolyte such as an ionic liquid or a solution in which the solid electrolyte is dissolved in a solvent is used. As the materials for the electrolyte, for example, inorganic ion salts such as alkali metal salts and alkaline earth metal salts, quaternary ammonium salts and acids, and supporting salts of alkalis may be used. Specific examples include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

As the solvent described above, for example, propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethene, polyethylene glycol, alcohols, and a mixed solvent thereof may be used.

Examples of the curable resin described above include general materials such as light curable resins and thermosetting resins including an acrylic resin, a urethane resin, an epoxy resin, a vinyl chloride resin, an ethylene resin, a melamine resin, and a phenol resin. The material having high compatibility with the electrolyte is preferable. As such a structure, ethylene glycol derivatives such as polyethylene glycol and polypropylene glycol. As the curable resin, a resin that is curable by light is preferably used. This is because the light curable resin allows the element to be produced at low temperature and in a short period as compared with a method for forming a thin film by thermal polymerization and evaporation of a solvent.

Particularly preferable combination is an electrolyte layer configured of a solid solution of a matrix polymer containing an oxyethylene chain and an oxypropylene chain and an ionic liquid. Use of this composition tends to satisfy both hardness and high ion conductivity.

The inorganic fine particles described above are not particularly limited as long as the inorganic fine particles are materials that can form a porous layer and retain the electrolyte and the curable resin. A material having a high insulation property, transparency, and durability is preferable from the viewpoints of the stability of electrochromic reaction and visibility. Specific examples of the material may include oxides or sulfide of silicon, aluminum, titanium, zinc, tin, and the like or the mixed product thereof.

The size (average particle diameter) of the inorganic fine particles described above is not particularly limited and can be appropriately selected depending on the purpose. The size is preferably 10 nm to 10 µm and more preferably 10 nm to 100 nm.

"Deterioration Prevention Layer 5c in Intermediate Part 5"

As a role of the deterioration prevention layer 5c, the deterioration prevention layer 5 reduces corrosion and deterioration of the second electrode part 8 caused by irreversible oxidation-reduction reaction by reverse reaction with the electrochromic layer 5a to achieve the balance of electric charge. As a result, the repeating stability of the photochromatic lens unit 1 (the electrochromic device) described above is improved. Here, the reverse reaction includes the case of acting as a capacitor in addition to the case where the deterioration prevention layer 5c is oxidized and reduced.

The material of the deterioration prevention layer 5c is not particularly limited as long as the material plays a role of preventing the electrode parts 7 and 8 from corrosion caused by the irreversible oxidation-reduction reaction and is appropriately selected depending on the purpose. As the material of the deterioration prevention layer 5c, antimony tin oxide, nickel oxide, titanium oxide, zinc oxide, tin oxide, or a conductive or semi-conductive metal oxide including these metal oxides may be used. In the case where the coloring of the deterioration prevention layer 5c does not cause trouble, the same materials as the electrochromic materials described above may be used.

Of these materials, a material having high transparency is preferably used as the deterioration prevention layer 5c in the case of producing the photochromatic lens unit 1 (the electrochromic device) as an optical element requiring transparency such as a lens. As such as material, n-type semi-conductive oxide fine particles (n-type semi-conductive metal oxide) are preferably used. As the n-type semi-conductive metal oxide, titanium oxide, tin oxide, and zinc oxide made of particles having a primary particle diameter of 100 nm or less or compound particles including some of these oxides or a mixed product may be used.

In addition, in the case where the intermediate part 5 includes the deterioration prevention layer 5c, the electrochromic layer 5a described above is preferably made of a material that caused color change by oxidation reaction. This is because, as the result of using the material, the electrochromic layer 5a is subjected to the oxidation reaction and, at the same time, the n-type semi-conductive metal oxide is easily reduced (electron injection), resulting in reduction in driving voltage.

In such a form, the particularly preferably electrochromic material is an organic polymer material. The film of the organic polymer material is easily formed by, for example, a coating application forming process and the organic polymer material can adjust and control color by the molecular structure. Specific examples of these organic polymer materials are reported in "Chemistry of Materials, Review 2011. 23, 397-415 Navigating the Color Palette of Solution-Processable Electrochromic Polymers (Reynolds)" (Non-Patent Document 1), "Macromolecules 1996. 29 7629-7630 (Reynolds)" (Non-Patent Document 2), "Polymer Journal, Vol. 41, No. 7, Electrochromic Organic Matallic Hybrid Polymers" (Non-Patent Document 3).

Examples of these organic polymer materials include poly(3,4-ethylenedioxythiophene)-based materials and a complex forming polymer of bis(terpyridine)s and iron ion.

On the other hand, examples of the material of a high transparent p-type semi-conductive layer serving as the deterioration prevention layer 5c include organic materials having nitroxyl radical (NO radical) such as derivatives of 2,2,6,6-tetramethylpiperidine-N-oxyl (TEMPO) or polymer materials of the derivatives.

A method for forming the deterioration prevention layer 5c is not particularly limited and can be appropriately selected depending on the purpose. Examples of the method include a vacuum vapor deposition method, a sputtering method, and an ion plating method. Examples include various printing methods such as a spin coating method, a casting method, a micro gravure coating method, a gravure coating method, a bar coating method, a roll coating method, a wire bar coating method, a dip coating method, a slit coating method, a capillary coating method, a spray coating method, a nozzle coating method, a gravure printing method, a screen printing method, a flexography method, an offset printing method, a reverse printing method, and an inkjet printing method as long as the material of the deterioration prevention layer 5c is capable of forming by coating application. The deterioration prevention layer 5c is not particularly limited. The deterioration prevention function can be provided to the electrolyte layer 5b itself by mixing the material for the deterioration prevention layer into the electrolyte layer 5b described above.

"Adhesion Layer 6"

The adhesion layer 6 is formed so as to physically and chemically protect the side part of the electrochromic layer 5a. The adhesion layer 6 can be formed by, for example, applying an ultraviolet curable or heat curable insulating resin so as to cover the side surface and/or the upper surface and thereafter curing the resin. Alternatively, the adhesion layer 6 can be formed by previously patterning a sheet-like product formed of the ultraviolet curable or heat curable insulating resin or the like, attaching the sheet-like product, and thereafter curing the sheet-like product. Alternatively, the adhesion layer 6 can be formed by previously patterning a sheet-like product formed of a pressure sensitive adhesive and attaching the sheet-like product.

The adhesion layer 6 preferably has a barrier property and is further preferably formed by stacking the curable resin and the inorganic material. The stacked structure with the inorganic material described above improves the barrier property to oxygen and water. Formation of a resin barrier layer in addition to the adhesion layer 6 is also advantageous for improving the barrier property.

As the inorganic material, a material having a high insulation property, transparency, and durability is preferable. Specific examples of the material include oxides, sulfides, and nitrides of silicon, aluminum, titanium, zinc, and tin or mixed products thereof. These films can be easily formed by a vacuum film formation process such as a sputtering method and a vapor deposition method.

The thickness of the adhesion layer 6 is not particularly limited and can be appropriately selected depending on the purpose. The adhesion layer 6 preferably has the same thickness as the thicknesses of the electrochromic layer 5a, the electrolyte layer 5b, and the deterioration prevention layer 5c described above. The adhesion layer 6 is preferably formed so as to cover an auxiliary electrode layer arranged at the spectacle marginal region and is preferably formed so as to separate the contact layers 7b and 8b described below and the intermediate part 5 (the electrochromic layer 5a, the electrolyte layer 5b, and the deterioration prevention layer 5c).

"Pair of Electrode Parts 7 and 8 (First Electrode Part 7 and Second Electrode Part 8)"

The first electrode part 7 is configured by stacking the first contact layer 7b onto the first electrode layer 7a. The first electrode layer 7a is adjacent to the inner surface 9b of the first support 9 and the first contact layer 7b is adjacent to the inner surface 10b of the second support 10. On the other hand, the second electrode part 8 is configured by staking the second contact layer 8b onto the second electrode layer 8a. The second electrode layer 8a is adjacent to the inner surface 10b of the second support 10 and the second contact layer 8b is adjacent to the inner surface 9b of the first support 9. In this case, both contact layers 7b and 8b are arranged in a position avoiding the intermediate part 5 (the electrochromic layer 5a, the electrolyte layer 5b, and the deterioration prevention layer 5c) described above.

The material of the first electrode layer 7a and the second electrode layer 8a is not particularly limited as long as the material has transparency and conductivity and can be appropriately selected depending on the purpose. Examples of the material include tin-doped indium oxide (hereinafter referred to as "ITO"), fluorine-doped indium oxide (hereinafter referred to as "FTO"), and antimony-doped indium oxide (hereinafter referred to as "ATO"). Of these compounds, an inorganic material including any one of indium oxide (hereinafter referred to as "In oxide"), tin oxide (hereinafter referred to as "Sn oxide"), and zinc oxide (hereinafter referred to as "Zn oxide") of which films are formed by vacuum film formation.

In oxide, Sn oxide, and Zn oxide are materials that can easily form films by a sputtering method and materials that can obtain excellent transparency and electric conductivity. Of these compounds, $InSnO$, $GaZnO$, $SnO$, $In_2O_3$, $ZnO$, and $InZnO$ are particularly preferable. As the crystallinity becomes lower, the electrode layers 7a and 8a become more preferable. This is because the material having a high crystallinity tends to divide the electrode layers by thermoforming. From this viewpoint, IZO and AZO that are amorphous films and exhibit high conductivity are preferable.

In the case where these electrode layers 7a and 8a materials are used, thermoforming is preferably carried out so that the maximum long axis length of the support on a curved surface of the stacked product after the thermoforming is 120% or lower relative to the maximum long axis length of the support in the plane of the stacked product before the thermoforming, and the thermoforming is more preferably carried out so that the maximum long axis length of the support in the curved surface after the thermoforming is 103% or lower.

Conductive thin metal films containing silver, gold, copper, aluminum, and the like, carbon films such as carbon nano-tube, and graphene, network electrodes of conductive metals, conductive carbons, conductive oxides, or the like, or a complex layer thereof are also useful. The network electrode is an electrode that has transparency by forming carbon nano-tube and other highly conductive nontransparent materials into a fine network state. The network electrode is preferable due to difficulty in dividing the electrode at the time of the thermoforming.

Furthermore, the stacked configuration of the network electrode and the conductive oxide or the stacked configuration of the conductive metal thin film and the conductive oxide are more preferable. The stacked configuration allows the electrochromic layer to develop or reduce color without unevenness. The conductive oxide layer can be formed by coating application of the conductive oxide as a nano-particle ink. Specifically, the stacked configuration of the conductive metal thin film and the conductive oxide is an electrode that satisfies both conductivity and transparency by using a thin film staked configuration such as ITO/Ag/ITO.

Each thickness of the electrode layers 7a and 8a is adjusted so as to obtain an electric resistance value required for the oxidation-reduction reaction of the electrochromic layer 5a. In the case where ITO film made by vacuum film formation is used as the material of the electrode layers 7a and 8a, each of the thickness of the electrode layers 7a and 8a is preferably 20 nm to 500 nm and more preferably 50 nm to 300 nm.

In the case were the conductive oxide layer is formed by applying as the nano-particle ink, the thickness of the conductive oxide layer described above is preferably 0.2 µm to 5 µm. The thickness of the network electrode described above is preferably 0.2 µm to 5 µm.

Furthermore, in the case where the photochromatic lens unit is used as a photochromatic mirror, either electrode layer 7a or electrode layer 8a may have a structure having a refection function. In this case, a metal material may be included as the material of the electrode layers 7a and 8a. Examples of the metal material include Pt, Ag, Au, Cr, rhodium, Al, alloys thereof, or stacked configurations thereof.

Examples of the production of each of the electrode layers 7a and 8a include a vacuum vapor deposition method, a sputtering method, and an ion plating method. Examples include various printing methods such as a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, a gravure printing method, a screen printing method, a flexography method, an offset printing method, a reverse printing method, and an inkjet method as long as the material of each of the electrode layers 7a and 8a is capable of forming by coating application.

The material of the first contact layer 7b and the second contact layer 8b is not particularly limited as long as the material is a conductive material. In particular, a conductive paste made by mixing the conductive fine particles with a resin is preferably used. Example of the conductive paste include a mixed product of silver fine particles, copper fine particles, nickel fine particles, or carbon particles with an epoxy resin, a polyester resin, an acrylic resin, and a silicone resin.

The thicknesses of the contact layers 7b and 8b are preferably the same as or thicker than the thicknesses of the electrochromic layer 5a and the electrolyte layer 5b described above and are suitably 5 µm to 200 µm and more suitably 30 µm to 100 µm. As one example, in FIG. 2, the thicknesses of the contact layers 7b and 8b are set to the same as or thicker than the thicknesses of the intermediate part 5 (the electrochromic layer 5a, the electrolyte layer 5b, and the deterioration prevention layer 5c) described above.

"Pair of Supports (First Support 9 and Second Support 10)"

The first support 9 and the second support 10 have the function of supporting the intermediate part 5 (the electrochromic layer 5a, the electrolyte layer 5b, and the deterioration prevention layer 5c), the first electrode part 7 (the first electrode layer 7a and the first contact layer 7b), and the second electrode part 8 (the second electrode layer 8a and the second contact layer 8b) described above.

As long as the supports 9 and 10 can support these intermediate part 5 and electrode parts 7 and 8, known resin materials that are capable of thermoforming can be used as they are. Furthermore, as the supports 9 and 10, for example, resin substrates made of a polycarbonate resin, an acrylic resin, a polyethylene resin, a polyvinyl chloride resin, a polyester resin, an epoxy resin, a melamine resin, a phenol resin, a polyurethane resin, and a polyimide resin may be used.

In the case where the photochromatic lens unit 1 (the electrochromic device) is a reflective display device that has visibility from the second electrode part 8 side, the transparency of either the support 9 or the support 10 is not necessary. The transparent insulation layer, an anti-reflection layer, or the like may be coated onto the surfaces of the supports 9 and 10 to improve a water vapor barrier property, a gas barrier property, and visibility. The thicknesses of the supports 9 and 10 is preferably 0.2 mm to 1.0 mm from the viewpoint that thermoforming can be easily carried out.

Figure 3:
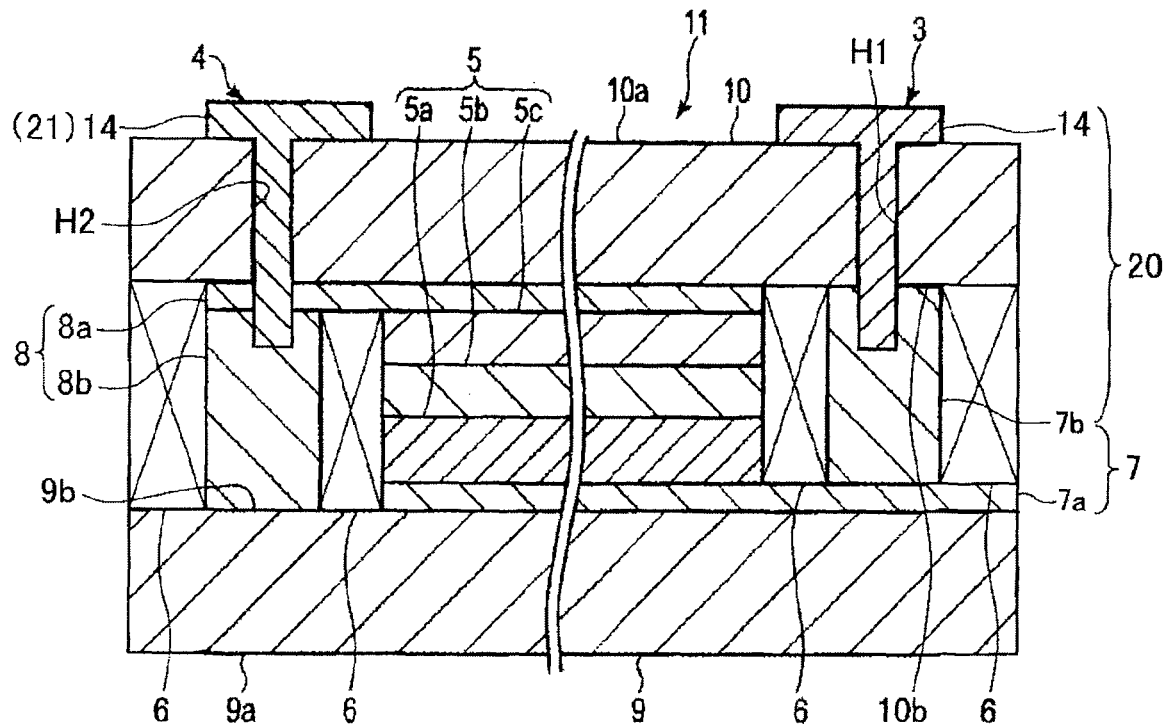
FIG. 3 is a sectional view taken from line F2-F2 of FIG. 1 according to a modification.

FIG. 3 is a sectional view of the electrochromic device according to a modification taken from line F2-F2 of FIG. 1. In the electrochromic device according to the modification, the first penetration structure H1 reaches the inside of the first contact layer 7b and the second penetration structure H2 reaches the inside of the second contact layer 8b. Other points are the same as the electrochromic device in FIG. 2.

Figure 4:
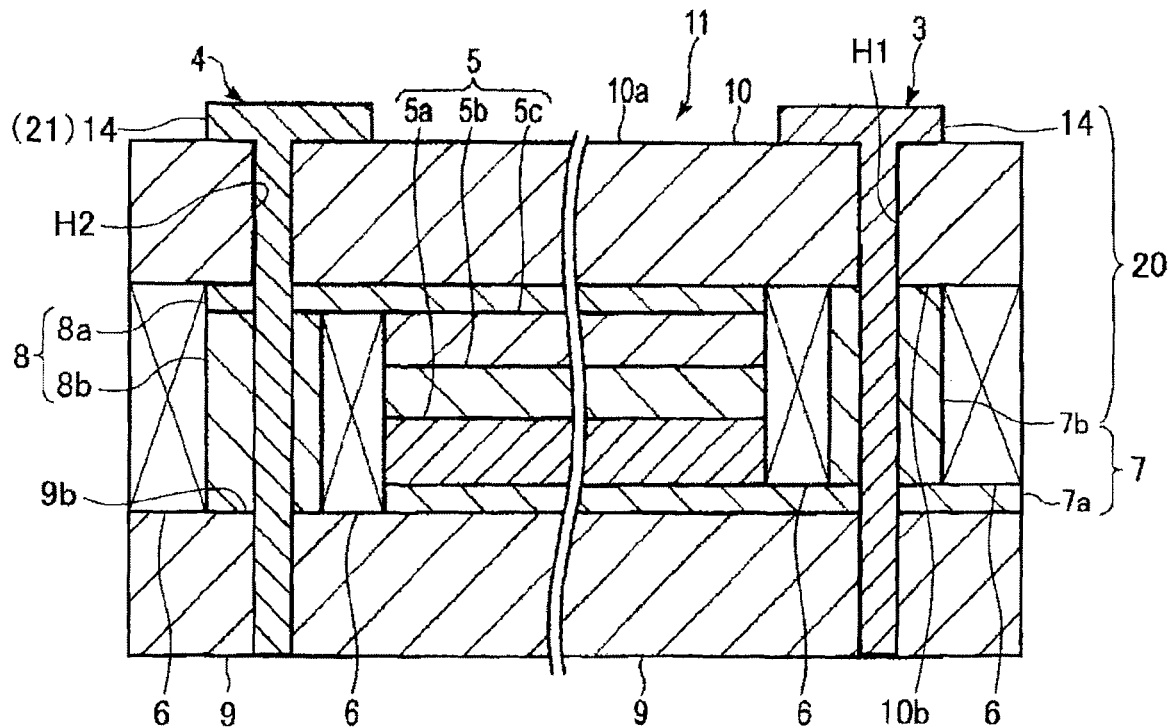
FIG. 4 is a sectional view taken from line F2-F2 of FIG. 1 according to another modification.

FIG. 4 is a sectional view of the electrochromic device according to another modification taken from line F2-F2 of FIG. 1. In the electrochromic device according to this modification, the first penetration structure H1 reaches the first support 9 penetrating the first contact layer 7b and second penetration structure H2 reaches the first support 9 penetrating the second contact layer 8b. Specifically, the first and second penetration structures reach the outer surface 9a of the first support 9. Other points are the same as the electrochromic device in FIG. 2.

Figure 5:
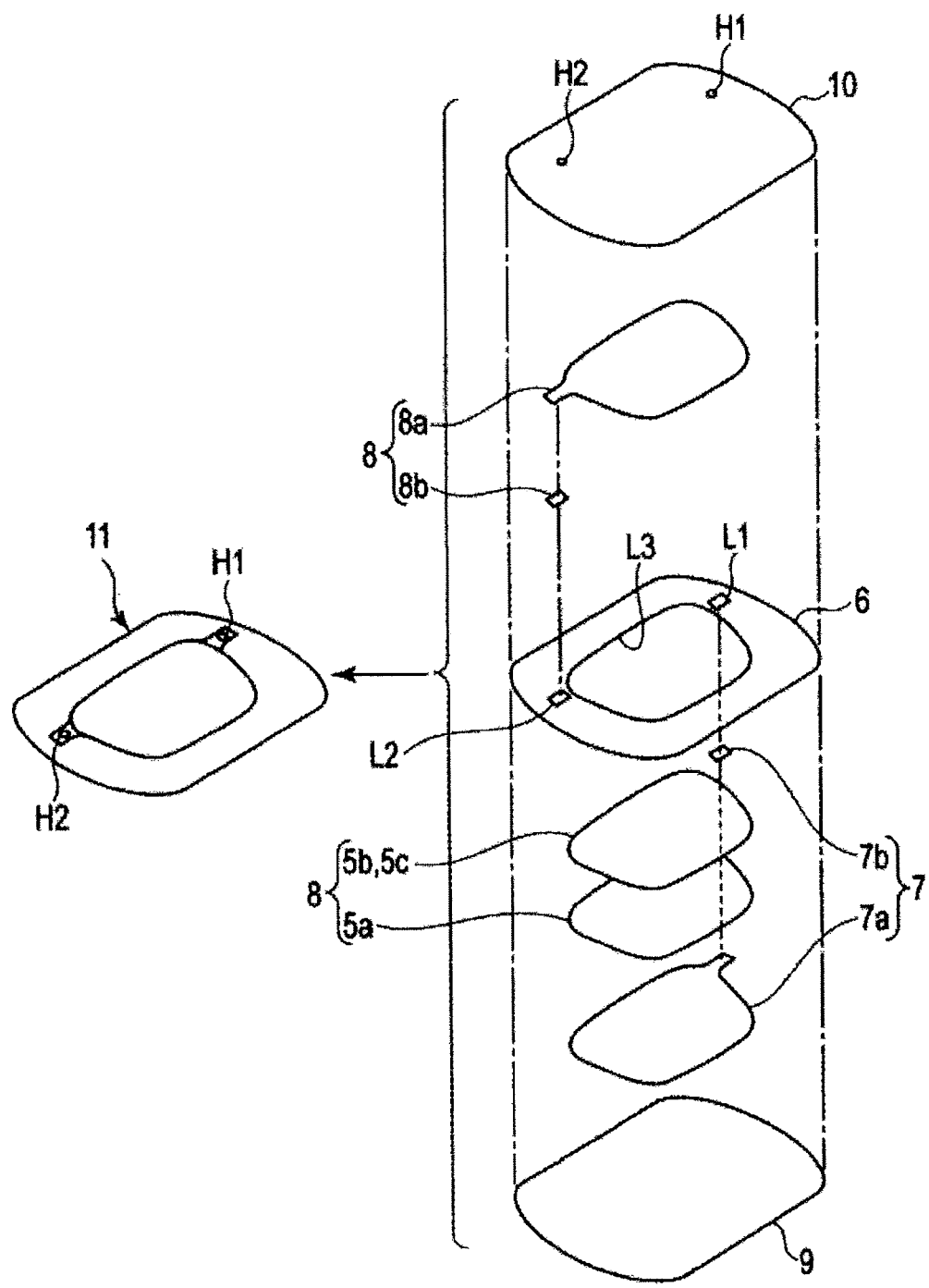
FIG. 5 is an exploded perspective view of an electrochromic element according to the first embodiment.

FIG. 5 and FIGS. 6A to 6E are schematic views illustrating the production method of the photochromatic lens unit 1 (the electrochromic device) illustrated in FIG. 1 and FIG. 2. In FIG. 5, the production method of the electrochromic element 11 before thermoforming is illustrated. In FIGS. 6A to 6E, the production method from thermoforming processing to lens shape processing. The production method illustrated in FIG. 5 and FIG. 6A to 6E is just one example and the technical scope of the present invention is not limited by this example. This production method is applicable for the production method of the electrochromic devices according to the modifications illustrated in FIG. 3 and FIG. 4.

As illustrated in FIG. 5, in the production method of the electrochromic element 11, the first penetration structure H1 and the second penetration structure H2 described above are previously provided on one of the supports (for example, the second support 10). These penetration structures H1 and H2 are through holes penetrating the second support 10 from the outer surface 10a to the inner surface 10b of the second support 10. The first penetration structure H1 reaches the first electrode part 7. On the other hand, the second penetration structure H2 reaches the second electrode part 8.

In the production method, for example, the first electrode part 7 is stacked on the inner surface 9b of the first support 9. The second electrode part 8 is stacked on the inner surface 10b of the second support 10. Subsequently, the intermediate part 5 (the electrochromic layer 5a, the electrolyte layer 5b, and the deterioration prevention layer 5c) intervenes between the electrode parts 7 and 8 to cure and thereafter the outer edge of the cured product is sealed with the adhesion layer 6. In the adhesion layer 6, three opening parts (a first opening part L1, a second opening part L2, and a third opening part L3) are previously formed.

The first opening part L1 is arranged so as to be opposite to the first contact layer 7b of the first electrode part 7 and has the approximately same profile as the profile of the first contact layer 7b. The second opening part L2 is arranged so as to be opposite to the second contact layer 2b of the second electrode part 8 and has the approximately same profile as the profile of the second contact layer 8b. The third opening part L3 is arranged so as to be opposite to the intermediate part 5 and has the approximately same profile as the profile of the intermediate part 5.

Thereafter, both of the supports 9 and 10 are bonded together with the intermediate part 5 and the electrode parts 7 and 8 interposed between the supports 9 and 10. By this operation, the electrochromic element 11 in which the electrochromic layer 5a is enclosed is produced. In the above examples, the first penetration structure H1 and the second penetration structure H2 described above are previously provided in one of the supports (for example, the second support 10). Alternatively, the penetration structures H1 and H2 may be formed at the final stage of the electrochromic element 11. In other words, the first electrode taking-out part 3 and the second electrode taking-out part 4 may be formed by forming the through holes corresponding to the penetration structures H1 and H2 at the final stage and filling the conductive material 14 to the through holes.

Subsequently, the thermoforming processing and the lens shape processing are carried out using the electrochromic element 11 (refer to FIGS. 6A to 6E). In the thermoforming processing and the lens shape processing, for example, the electrochromic element 11 described above is prepared (FIG. 6A). The electrochromic element 11 is subjected to the thermoforming processing and thereafter the thermoformed electrochromic element 11 and an optical lens 12 are bonded together by sheet insert injection (FIG. 6B). Thus, the electrochromic device 1 made of the electrochromic element 11 and the optical lens 12 is produced (FIG. 6C).

Thereafter, a processing process to the electrochromic device 1 is carried out (FIG. 6D). In the processing process, for example, the conductive material 14 filled in the both of the through holes (penetration structures H1 and H2) are extended in a plane shape, and thereafter a processing line 13 for processing the electrochromic device 1 to a predetermined profile is set. Along the processing line 13, the lens shape processing is carried out, whereby the photochromatic lens unit 1 having the electrode taking-out parts 3 and 4 at both ends is produced.

In this state, a pair of the electrode taking-out parts 3 and 4 in which parts of the electrode parts 7 and 8 extend along the outer surface 10a of the second support 10 in a plane shape are configured (FIG. 6E). The electrode taking-out parts 3 and 4 are exposed to the outside through the second support 10 and electrically connected one by one to the electrode parts 7 and 8, respectively.

As one example, in FIG. 6E, the first electrode taking-out part 3 is enlarged. By the lens shape processing along the processing line 13 described above, a profile protruding outward remains at the upper both ends it of the photochromatic lens unit 1 (the photochromatic lens body 2). The electrode taking-out parts 3 and 4 extend in a plane shape along the outer surface of this remaining part.

Instead of filling the conductive material 14 in the through holes (the penetration structures H1 and H2), for example, the conductive material 14 may be previously formed into a rivet shape and the formed materials may be inserted into the through holes (the penetration structures H1 and H2). Alternatively, metal rivets are inserted into the through holes (the penetration structures H1 and H2).

"Optical Lens 12"

As the material of the optical lens 12, transparent materials such as a polycarbonate resin, an allyl diglycol carbonate resin, a diallyl carbonate resin, a diallyl phthalate resin, a urethane resin, a thiourethane resin, an episulfide resin, a methacrylate resin, and a cycloolefin resin are suitably used. However, the material is not limited to these resins.

The optical lens 12 can be adhesion-formed by, for example, curing again after melting, curing by applying light or heat, and bonding together with an optical transparent adhesive so that these transparent resins are contacted to one of the outer surfaces. The adhesion-forming method of the optical lens 12, however, is not limited to these methods. For example, processing methods such as in-mold injection forming, film (sheet) insert injection forming, film (sheet) insert cast forming, and bonding together using a transparent optical (optical transparent) adhesive/adhesion film can be selected.

By setting the curvature radius after curing while considering deformation such as curing shrinkage, any diopters can be imparted to the electrochromic device by adjusting the curvature of a light incident surface and/or the curvature of a light emission surface of the optical lens 12. By forming the optical lens 12 and thereafter forming a desired curved shape by cutting, lens processing (diopter processing and the like) satisfying the user-specific requirements can be carried out. Namely, preparation of molds and parts for every product shape is unnecessary and high-mix low volume production for high precision products is easily achieved.

"Actions and Effects of Embodiments"

According to the present embodiment, in the electrochromic device 1 (the photochromatic lens unit) made of the electrochromic element 11 and the optical lens 12, sites electrically connecting to the power source and the driving circuit (that is, electrode taking-out parts 3 and 4) are exposed to the outside while extending in a plane shape. This allows electric connection of the electrochromic device 1 (the electrochromic element 11 and the photochromatic lens unit 1) to the power source and the driving circuit to be stabilized.

In other words, by extending the electrode taking-out parts 3 and 4 in a plane shape, the contact area to the electrode taking-out parts 3 and 4 can be increased and the contact pressure can be uniform. As a result, the occurrence of electric contact failure can be reduced. Thus, the electrochromic device 1 (the electrochromic element 11 and the photochromatic lens unit 1) that can be stably used for a long period of time, is excellent in electrochromic reaction, and has high reliability can be achieved.

In the case where the place where the taking-out electrode parts extend in a plane shape is a place where the taking-out electrode parts are in parallel with the electrochromic layer in the outer surface, the area can be set significantly large as compared with the case where the taking-out electrode parts are exposed at the end surface of the device in a thickness direction of the electrochromic layer as Example in Japanese Unexamined Patent Application Publication No. 2018-132635. This is because the scale in the thickness direction is in µm unit, whereas the place where the taking-out electrode parts are in parallel with the electrochromic layer in the outer surface can set the thickness in mm unit.

In particular, when the taking-out electrode parts are exposed in at least one of plane regions of the supports at both sides, the taking-out electrodes can be provided without enlarging the planar size of the whole device. Here, the plane region is a region of the support emerging in the plan view when the thickness direction of the electrochromic layer is determined to be up and down direction.

"Other Configurations of First Embodiment"

Figure 7:
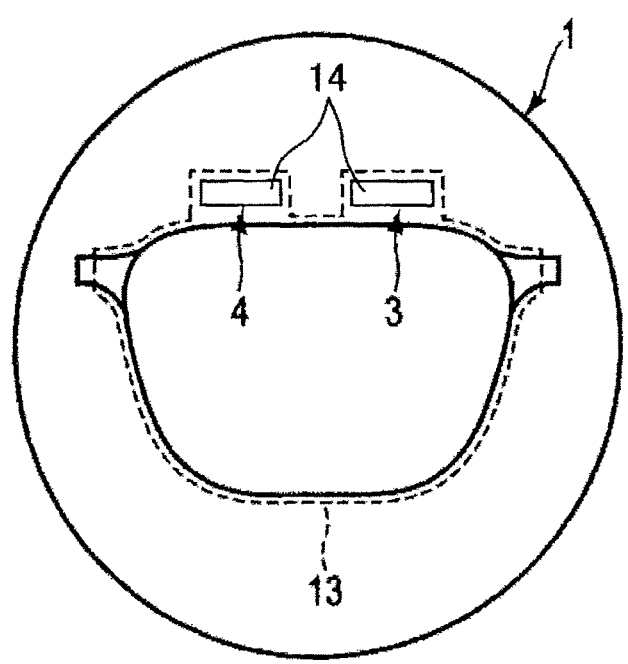
FIG. 7 is a plan view of the photochromatic lens unit of another configuration according to the first embodiment.

FIG. 7 is another arrangement configuration view of the electrode taking-out parts 3 and 4. The arrangement of the electrode taking-out parts 3 and 4 is not limited to the protruding parts of upper both ends on the photochromatic lens body 2 (refer to FIG. 1) described above and may be parts where the electrode taking-out parts 3 and 4 can be extended in a plane shape. As one example, in FIG. 7, the electrode taking-out parts 3 and 4 are arranged side by side at the upper side of the part that should be the photochromatic lens body.

The present invention is not limited to the first embodiment described above and the content of the invention according to each modification described below is included in the technical scope of the present invention and exhibits the same actions and effects.

"First Modification"

Figure 8:
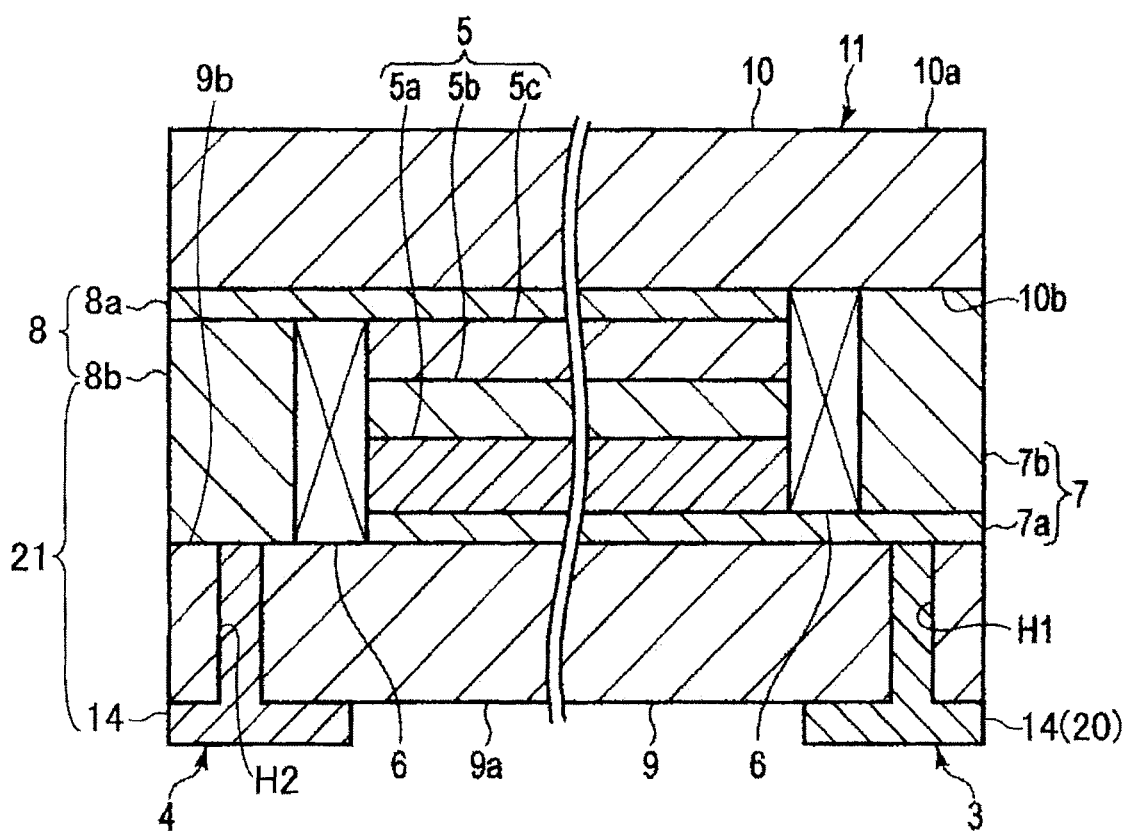
FIG. 8 is a sectional view of an electrochromic element according to the first modification according to the first embodiment.

FIG. 8 is a sectional view of the electrochromic element 11 that is a main component of the electrochromic device 1 (refer to FIG. 1) according to the first modification. In this modification, both of a pair of the electrode taking-out parts 3 and 4 are exposed to the outside through the other support (that is, the first support 9). In this modification, other configurations other than the configuration described below and the actions and the effects are the same as the embodiments described above and thus the description of other configurations will be omitted.

As illustrated in FIG. 8, one of the electrode taking-out parts (for example, the first electrode taking-out part 3) includes the first penetration structure H1. The first penetration structure H1 extends by penetrating from the outer surface 9a to the inner surface 9b of the first support 9. The first penetration structure H1 reaches one of the electrode parts (for example, the first electrode part 7) while avoiding the other electrode part (for example, the second electrode part 8).

Here, the first penetration structure H1 is a through hole penetrating the first support 9 from the outer surface 9a to the inner surface 9b. The first electrode taking-out part 3 is configured by extending a conductive material 14 filled in the through hole (the first penetration structure H1) in a plane shape along the outer surface 9a of the first support 9.

In this case, the conductive material 14 filled in the through hole (the first penetration structure H1) reaches the first electrode part 7. In this configuration, the first electrode taking-out part 3 is electrically connected to the first electrode part 7. Thus, a part of the first electrode part 7 is exposed to the outside and extends in a plane shape.

The other electrode taking-out part (for example, the second electrode taking-out part 4) includes the second penetration structure H2. The second penetration structure H2 extends by penetrating from the outer surface 9a to the inner surface 9b of the first support 9. The second penetration structure H2 reaches the other electrode part (for example, the second electrode part 8) while avoiding one of the electrode parts (for example, the first electrode part 7).

Here, the second penetration structure H2 is a through hole penetrating the first support 9 from the outer surface 9a to the inner surface 9b. The second electrode taking-out part 4 is configured by extending the conductive material 14 filled in the through hole (the second penetration structure H2) in a plane shape along the outer surface 9a of the first support 9. In this case, the conductive material 14 filled in the through hole (the second penetration structure H2) reaches the second electrode part 8. In this configuration, the second electrode taking-out part 4 is electrically connected to the second electrode part 8. Thus, a part of the second electrode part 8 is exposed to the outside and extends in a plane shape.

"Second Modification"

Figure 9:
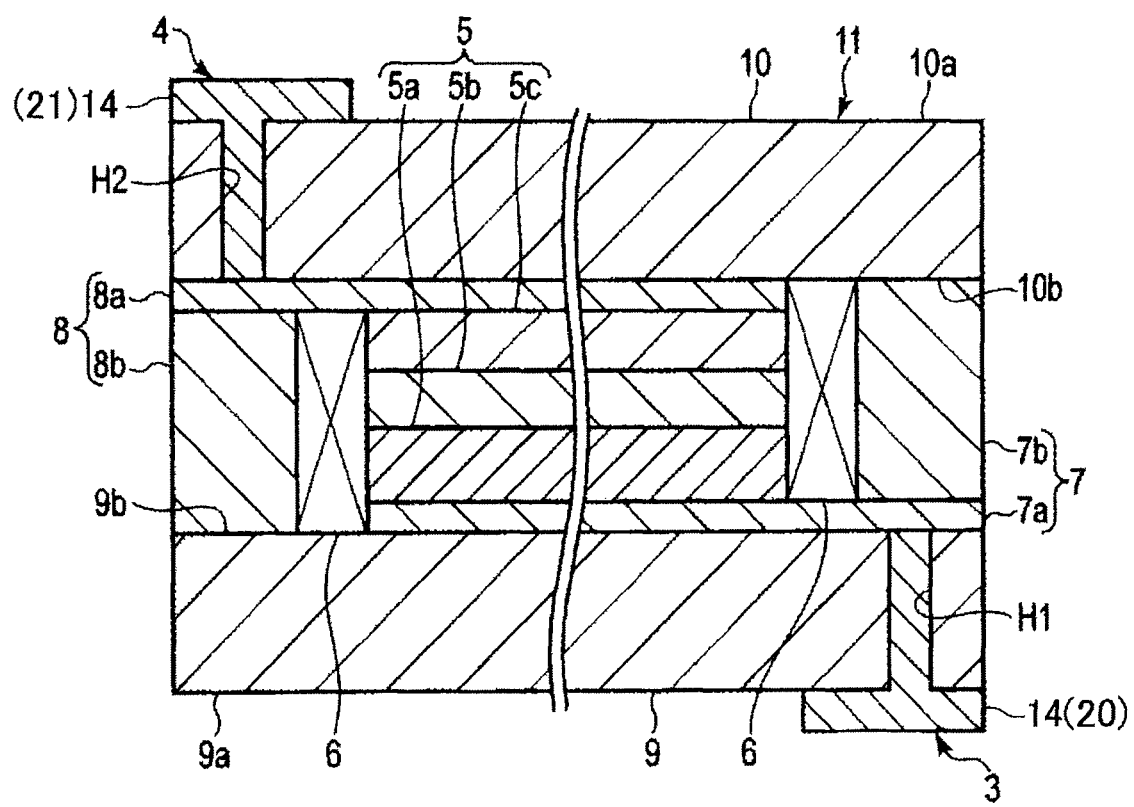
FIG. 9 is a sectional view of an electrochromic element according to the second modification according to the first embodiment.

FIG. 9 is a sectional view of the electrochromic element 11 that is a main component of the electrochromic device 1 (refer to FIG. 1) according to the fourth modification. In this modification, a pair of the electrode taking-out parts 3 and 4 are exposed to the outside through both supports (that is, the first support 9 and the second support 10).

As one example, in FIG. 9, the first penetration structure H1 extends by penetrating the outer surface 9a to the inner surface 9b of the other support (that is, the first support 9). The second penetration structure H2 extends by penetrating from the outer surface 10a to the inner surface 10b of one of the supports (that is, the second support 10). In this modification, other configurations other than the configuration described below and the actions and the effects are the same as the embodiments described above and thus the description of other configurations will be omitted.

The first penetration structure H1 reaches one of the electrode parts (for example, the first electrode part 7) while avoiding the other electrode part (for example, the second electrode part 8). The first penetration structure H1 is a through hole penetrating the first support 9 from the outer surface 9a to the inner surface 9b. The first electrode taking-out part 3 is configured by extending the conductive material 14 filled in the through hole (the first penetration structure H1) in a plane shape along the outer surface 9a of the first support 9. In this case, the conductive material 14 filled in the through hole (the first penetration structure H1) reaches the first electrode part 7. In this configuration, the first electrode taking-out part 3 is electrically connected to the first electrode part 7. Thus, a part of the first electrode part 7 is exposed to the outside and extends in a plane shape.

The second penetration structure H2 reaches one of the electrode parts (for example, the first electrode part 7) while avoiding the other electrode part (for example, the second electrode part 8). The second penetration structure H2 is a through hole penetrating the second support 10 from the outer surface 10a to the inner surface 10b. The second electrode taking-out part 4 is configured by extending the conductive material 14 filled in the through hole (the second penetration structure H2) in a plane shape along the outer surface 10a of the second support 10. In this case, the conductive material 14 filled in the through hole (the second penetration structure H2) reaches the second electrode part 8. In this configuration, the second electrode taking-out part 4 is electrically connected to the second electrode part 8. Thus, a part of the second electrode part 8 is exposed to the outside and extends in a plane shape.

(Example)

Hereinafter, the present invention will be described with reference to Example. The present invention, however, is not limited to Example. In this Example, the case where the photochromatic lens unit 1 (the electrochromic device) illustrated in FIG. 1, FIG. 2, FIG. 5, and FIGS. 6A to 6E is produced is assumed.

"Forming first electrode layer 7a and electrochromic layer 5a in first electrode part 7"

First, an oval polycarbonate substrate having a maximum long axis length of 75.5 mm, a maximum short axis length of 54 mm, and a thickness of 0.3 mm was prepared as the first support 9. On the first support 9, an ITO film having a thickness of about 100 nm was formed by a sputtering method to form the first electrode layer 7a.

Subsequently, a titanium oxide nano-particle dispersion liquid (trade name: SP210, manufactured by Showa Titanium Co., Ltd., average particle diameter: 20 nm) was applied on the surface of the ITO film by a spin coating method and the coated dispersion liquid was subjected to annealing treatment at 120° C. for 15 minutes to form a nano-structure semiconductor material having a thickness of about 1.0 μm and made of the titanium oxide particle film.

Subsequently, a 2,2,3,3-tetrafluoropropanol solution including 1.5% by mass of the electrochromic compound represented by the following structural formula (A) was applied by the spin coting method and the applied solution was subjected to annealing treatment at 120° C. for 10 minutes to form the electrochromic layer 5a that is supported on (adsorbed to) the titanium oxide particle film described above.

[Chemical Formula 2]

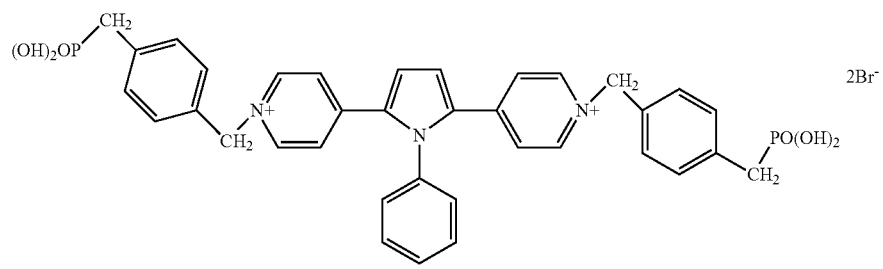

Structural Formula (A)

Subsequently, on the electrochromic layer 5a, a $SiO_2$ fine particle dispersion liquid (silica solid content concentration 24.8% by mass, polyvinyl alcohol 1.2% by mass, and water 74% by mass) having an average primary particle diameter of 20 nm was applied by spin-coating to form an insulating inorganic fine particle layer having a thickness of 2 μm.

"Forming Second Electrode Layer 8a in Second Electrode Part 8"

A polycarbonate substrate having the same shape and the same thickness as the first support 9 was prepared as the second support 10. In the second support 10, the penetration structures H1 and H2 (refer to FIG. 5) were previously provided. On the second support 10, an ITO film having a thickness of about 100 nm was formed by a sputtering method to form the second electrode layer 8a.

"Forming Adhesion Layer 6"

Subsequently, an optical transparent adhesive sheet (trade name: LA-50, manufactured by Nitto Denko Corporation) was processed into the shape illustrated in FIG. 5 and thereafter the processed sheet was bonded using a laminating device onto the first support 9 on which the first electrode layer 7a and the electrochromic layer 5a were formed.

"Forming Contact Layers 7b and 8b in Electrode Parts 7 and 8"

Subsequently, a conductive paste (Dotite XA-910, manufactured by FUJIKURA KASEI CO., LTD.) was applied on the first support 9 on which the first electrode layer 7a, the electrochromic layer 5a, and the adhesion layer 6 were formed at a position illustrated in FIG. 5 using a dispensing device.

"Forming Electrolyte Layer 5b and Deterioration Prevention Layer 5c and Bonding Supports 9 and 10 Together"

Subsequently, onto the surface of the insulating inorganic fine particle layer on the first support 9, a solution in which polyethylene glycol diacrylate (PEG 400DA, manufactured by Nippon Kayaku Co., Ltd.), a photopolymerization initiator (IRG 184, manufactured by BASF SE), and an electrolyte (1-ethyl-3-methylimidazolium salt) were mixed in a mass ratio of 100:5:40 was applied using a dispensing device and the resultant product was bonded together with the second support 10 using a vacuum laminating device. The resultant product was cured by ultraviolet rays (UV) to form the electrolyte layer 5b. In addition, the deterioration prevention layer 5c was formed on the formed electrolyte layer 5b.

By the above processes, the electrochromic element 11 before thermoforming illustrated in FIG. 2 and FIG. 5 was prepared.

"3D Thermoforming"

The prepared electrochromic element 11 was sandwiched between a concave mold and a convex mold having a curvature radius of about 130 mm while the molds were being heated at 146° C. to form the electrochromic element 11 of Example 1 having a 3D spherical surface shape (refer to FIG. 6B).

The maximum long axis length of the support on the curved surface of the electrochromic element 11 after the thermoforming was 76 mm. The maximum long axis length of the support in the curved surface of the electrochromic element 11 after the thermoforming relative to the maximum long axis length of the support in the plane of the electrochromic element 11 before the thermoforming was (76 mm/75.5 mm)×100=100.7%.

"Adhesion Forming Optical Lens 12"

Using a polycarbonate resin Iupilon CLS 3400 (manufactured by Mitsubishi Engineering-Plastics Corporation) as the material of the optical lens 12 adhering to the electrochromic element 11 after the thermoforming, the electrochromic element 11 was inserted into a mold and a lens-shape product was integrally formed by injection molding (refer to FIG. 6C). Thus, the electrochromic device 1 including the electrochromic element 11 and the optical lens 12 was formed by sheet insert injection mold.

"Processing of Optical Lens 12 and Electrochromic Device 1 and Exposure of Contact Layer"

Thereafter, the surface of the optical lens 12 formed by adhering to the electrochromic device 1 was processed by cutting, allowing the surface of the optical lens 12 to have a curvature. Furthermore, the electrochromic device 1 (the electrochromic element 11 and the optical lens 12) was subjected to cutting and the lens shape processing was carried out so that the electrochromic device 1 was processed to a size fitted in a spectacle frame (to process in a spectacle lens-like shape).

At this time, the electrochromic device 1 was formed into a predetermined profile along the processing line 13 (refer to FIG. 6D).

"Second Embodiment"

Subsequently, the second embodiment will be described. Hereinafter, in the description of the second embodiment, the parts same as the first embodiment will be omitted and the parts different from the first embodiment will be described.

Figure 10:
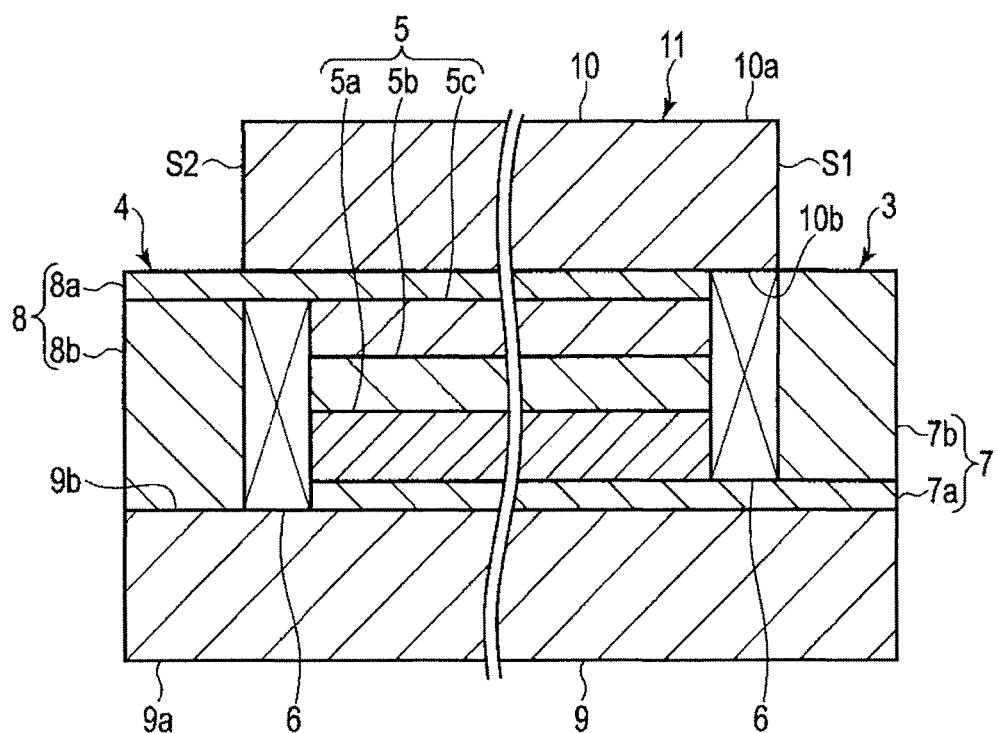
FIG. 10 is a sectional view of an electrochromic element that is the main component of a photochromatic lens unit 1 according to a second embodiment.

FIG. 10 is a sectional view of the electrochromic element 11 serving as the main component of the photochromatic lens unit 1 (the photochromatic lens body 2) as the electrochromic device according to the second embodiment. The electrochromic element 11 is a substance utilizing a phenomenon (electrochromism) in which oxidation-reduction reaction reversibly occurs by applying voltage to reversibly change color. The electrochromic element 11 (the photochromatic lens body 2) includes an intermediate part 5, an adhesion layer 6, a pair of electrode layers (a first electrode 7 and a second electrode 8), and a pair of supports (a first support 9 and a second support 10).

The electrode parts 7 and 8 are adjacently arranged at both sides in the thickness direction of the intermediate part 5 described below. The supports 9 and 10 include outer surfaces 9a and 10a and inner surfaces 9b and 10b and are adjacently arranged at both sides of the electrode parts 7 and 8. In this case, the inner surfaces 9b and 10b of the supports 9 and 10 are adjacent to the electrode parts 7 and 8. In the electrode taking-out parts 3 and 4, parts of the electrode parts 7 and 8 are exposed to the outside in a plane shape. The electrode taking-out parts 3 and 4 are electrically connected one by one to the electrode parts 7 and 8.

Furthermore, one of the electrode taking-out parts (for example, the first electrode taking-out part 3) is exposed to the outside through a first penetration structure S1 (a cut part described below (a slit)). The other electrode taking-out part (for example, the second electrode taking-out part 4) is exposed to the outside through a second penetration structure S2 (a cut part described below (a slit)). In the example in FIG. 10, both electrode taking-out parts 3 and 4 are exposed together to the outside through one of the supports (that is, the second support 10).

Figure 11:
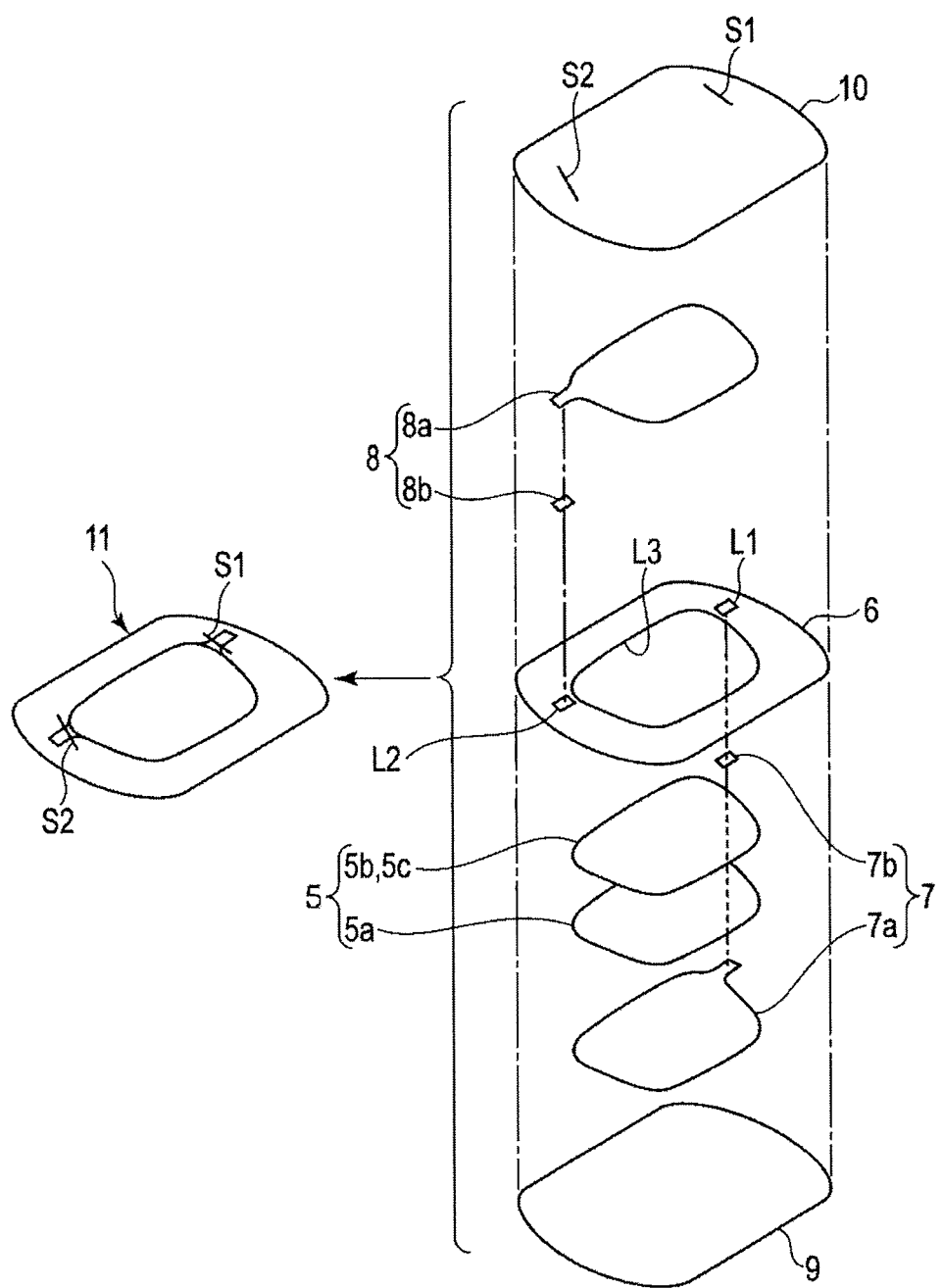
FIG. 11 is an exploded perspective view of an electrochromic element according to the second embodiment.

FIG. 11 and FIGS. 12A to 12E are schematic views illustrating the production method of the photochromatic lens unit 1 (the electrochromic device). In FIG. 11, the production method of the electrochromic element 11 before thermoforming is illustrated. In FIGS. 12A to 12E, the production method from thermoforming processing to lens shape processing is illustrated. The production method illustrated in FIG. 11 and FIGS. 12A to 12E is just one example and the technical scope of the present invention is not limited by this example.

As illustrated in FIG. 11, in the production method of the electrochromic element 11, the first penetration structure S1 and the second penetration structure S2 described above are previously provided in one of the supports (for example, the second support 10). These penetration structures S1 and S2 are the cut part (also referred to as the slits) extending by penetrating from the outer surface 10a to the inner surface 10b of the second support 10. The slit-like first penetration structure S1 reaches the first electrode part 7. On the other hand, the slit-like second penetration structure S2 reaches the second electrode part 8.

In the production method, for example, the first electrode part 7 is stacked on the inner surface 9b of the first support 9. The second electrode part 8 is stacked on the inner surface 10b of the second support 10. Subsequently, the intermediate part 5 (the electrochromic layer 5a, the electrolyte layer 5b, and the deterioration prevention layer 5c) intervenes between the electrode parts 7 and 8 to cure and thereafter the outer edge of the cured product is sealed with the adhesion layer 6. In the adhesion layer 6, three opening parts (a first opening part L1, a second opening part L2, and a third opening part L3) are previously formed.

The first opening part L1 is arranged so as to be opposite to the first contact part 7b of the first electrode part 7 and has the approximately same profile as the profile of the first contact part 7b. The second opening part L2 is arranged so as to be opposite to the second contact layer 8b of the second electrode part 8 and has the approximately same profile as the profile of the second contact layer 8b. The third opening part L3 is arranged so as to be opposite to the intermediate part 5 and has the approximately same profile as the profile of the intermediate part 5.

Thereafter, both of the supports 9 and 10 are bonded together with the intermediate part 5 and the electrode parts 7 and 8 interposed between the supports 9 and 10. By this operation, the electrochromic element 11 in which the electrochromic layer 5a is enclosed is produced. Subsequently, the thermoforming processing and the lens shape processing are carried out using the electrochromic element 11 (refer to FIGS. 12A to 12E).

In the thermoforming processing and the lens shape processing, for example, the electrochromic element 11 described above is prepared (FIG. 12A). The electrochromic element 11 is subjected to the thermoforming processing and thereafter the thermoformed electrochromic element 11 and an optical lens 12 are bonded together by sheet insert injection (FIG. 12B). Thus, the electrochromic device 1 made of the electrochromic element 11 and the optical lens 12 is produced (FIG. 12C).

Thereafter, a processing process to the electrochromic device 1 is carried out. In the processing process, a processing line 13 for processing the electrochromic device 1 to a predetermined profile is set (FIG. 12D). In this case, the processing line 13 is set so as to intersect with the penetration structures S1 and S2. Along the processing line 13, the lens shape processing is carried out, whereby the photochromatic lens unit 1 is produced.

In this state, parts P1 and P2 of the second support 10 surrounded by the processing line 13 and the penetration structures S1 and S2 are removed. This allows a pair of the electrode taking-out parts 3 and 4 in which parts of the electrode parts 7 and 8 extend along the outer surface 10a of the second support 10 in a plane shape to be configured (FIG. 12E). The electrode taking-out parts 3 and 4 are exposed to the outside through the second support 10 and electrically connected one by one to the electrode parts 7 and 8, respectively.

As one example, in FIG. 12E, the first electrode taking-out part 3 is enlarged. By the lens shape processing along the processing line 13 described above, a profile protruding outward remains at the upper both ends it of the photochromatic lens unit 1 (the photochromatic lens body 2). The electrode taking-out parts 3 and 4 extend in a plane shape along the outer surface of these remaining parts.

"Optical Lens 12"

As the material of the optical lens 12, transparent materials such as a polycarbonate resin, an allyl diglycol carbonate resin, a diallyl carbonate resin, a diallyl phthalate resin, a urethane resin, a thiourethane resin, an episulfide resin, a methacrylate resin, and a cycloolefin resin are suitably used. However, the material is not limited to these resins.

The optical lens 12 can be adhesion-formed by, for example, curing again after melting, curing by applying light or heat, and bonding together with an optical transparent adhesive so that these transparent resins are contacted to one of the outer surfaces. The adhesion-forming method of the optical lens 12, however, is not limited to these methods. For example, processing methods such as in-mold injection forming, film (sheet) insert injection forming, film (sheet) insert cast forming, and bonding together using a transparent optical (optical transparent) adhesive/adhesion film can be selected.

By setting the curvature radius after curing while considering deformation such as curing shrinkage after curing, any diopters can be imparted to the electrochromic device by adjusting the curvature of a light incident surface and/or the curvature of a light emission surface of the optical lens 12. By forming the optical lens 12 and thereafter forming a desired curved shape by cutting, lens processing (diopter processing and the like) satisfying the user-specific requirements can be carried out. Namely, preparation of molds and parts for every product shape is unnecessary and high-mix low volume production for high precision products is easily achieved.

"Actions and Effects of Second Embodiments"

According to the present embodiment, in the electrochromic device 1 (the photochromatic lens unit) made of the electrochromic element 11 and the optical lens 12, sites electrically connecting to the power source and the driving circuit (that is, the electrode taking-out parts 3 and 4) are exposed to the outside while extending in a plane shape. This allows electric connection of the electrochromic device 1 (the electrochromic element 11 and the photochromatic lens unit 1) to the power source and the driving circuit to be stabilized.

In other words, by extending the electrode taking-out parts 3 and 4 in a plane shape, the contact area to the electrode taking-out parts 3 and 4 can be increased and the contact pressure can be uniform. As a result, the occurrence of electric contact failure can be reduced. Thus, the electrochromic device 1 (the electrochromic element 11 and the photochromatic lens unit 1) that can be stably used for a long period of time, is excellent in electrochromic reaction, and has high reliability can be achieved.

"Other Configurations of Second Embodiment"

Figure 13:
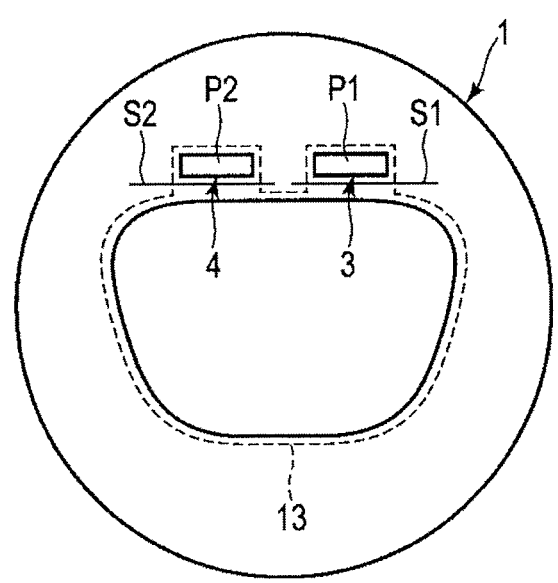
FIG. 13 is a plan view of the photochromatic lens unit of another configuration according to the second embodiment.

FIG. 13 is another arrangement configuration view of the electrode taking-out parts 3 and 4. The arrangement of the electrode taking-out parts 3 and 4 is not limited to the protruding parts of upper both ends on the photochromatic lens body 2 (refer to FIG. 1) described above and may be parts where the electrode taking-out parts 3 and 4 can be extended in a plane shape.

As one example, in FIG. 13, the electrode taking-out parts 3 and 4 are arranged side by side at the upper side of the part that should be the photochromatic lens body. Therefore, the penetration structures S1 and S2 are set so as to have a profile surrounding the linearly extending processing line 13. In this state, parts P1 and P2 of the second support 10 surrounded by the processing line 13 and the penetration structures S1 and S2 are removed. This allows the pair of the electrode taking-out parts 3 and 4 in which parts of the electrode parts 7 and 8 extend along the outer surface 10a of the second support 10 in a plane shape to be configured.

"First Modification"

Figure 14:
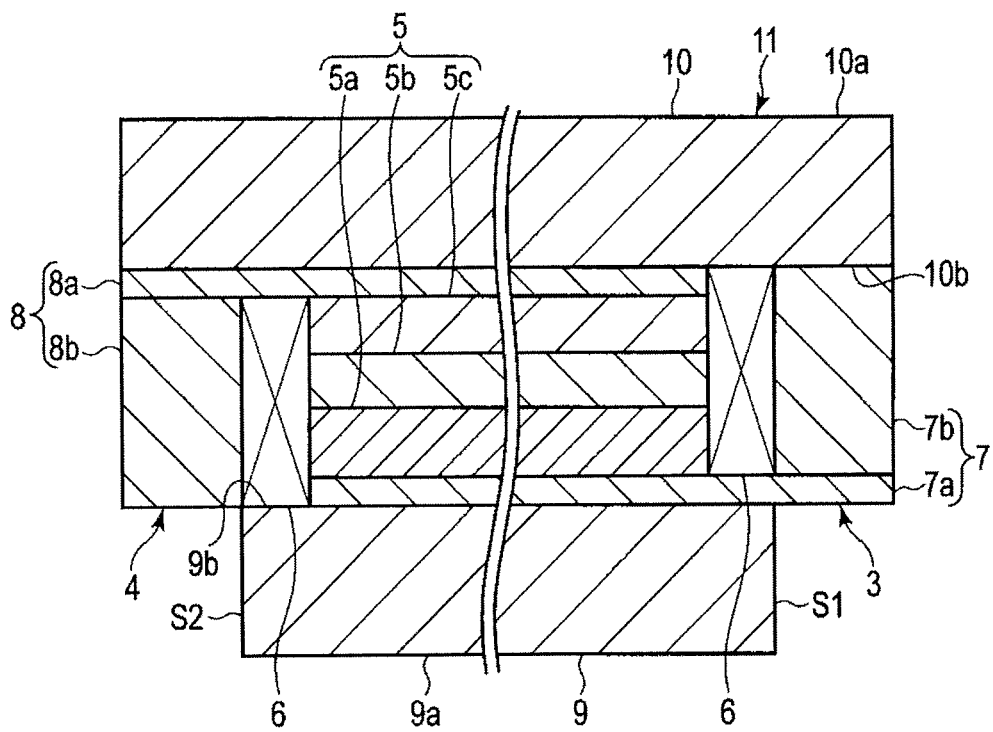
FIG. 14 is a sectional view of the electrochromic element according to a first modification according to the second embodiment.

FIG. 14 is a sectional view of the electrochromic element 11 that is a main component of the electrochromic device 1 (refer to FIG. 1) according to the first modification. In this modification, both of the pair of the electrode taking-out parts 3 and 4 are exposed to the outside through the other support (that is, the first support 9). In this modification, other configurations other than the configuration described below and the actions and the effects are the same as the second embodiment described above and thus the description of other configurations will be omitted.

The first penetration structure S1 extends by penetrating from the outer surface 9a to the inner surface 9b of the first support 9. The first penetration structure S1 reaches one of the electrode parts (for example, the first electrode part 7) while avoiding the other electrode part (for example, the second electrode part 8). In this case, a part of the first support 9 is removed by the first penetration structure S1. In this configuration, a part of the first electrode part 7 is exposed to the outside and extends in a plane shape. Thus, the first electrode taking-out part 3 is electrically connected to the first electrode part 7.

The second penetration structure S2 extends by penetrating from the outer surface 9a to the inner surface 9b of the first support 9. The second penetration structure S2 reaches the other electrode part (for example, the second electrode part 8) while avoiding the one of the electrode parts (for example, the first electrode part 7). In this case, a part of the first support 9 is removed by the second penetration structure S2. In this configuration, a part of the second electrode part 8 is exposed to the outside and extends in a plane shape. Thus, the second electrode taking-out part 4 is electrically connected to the second electrode part 8.

"Second Modification"

Figure 15:
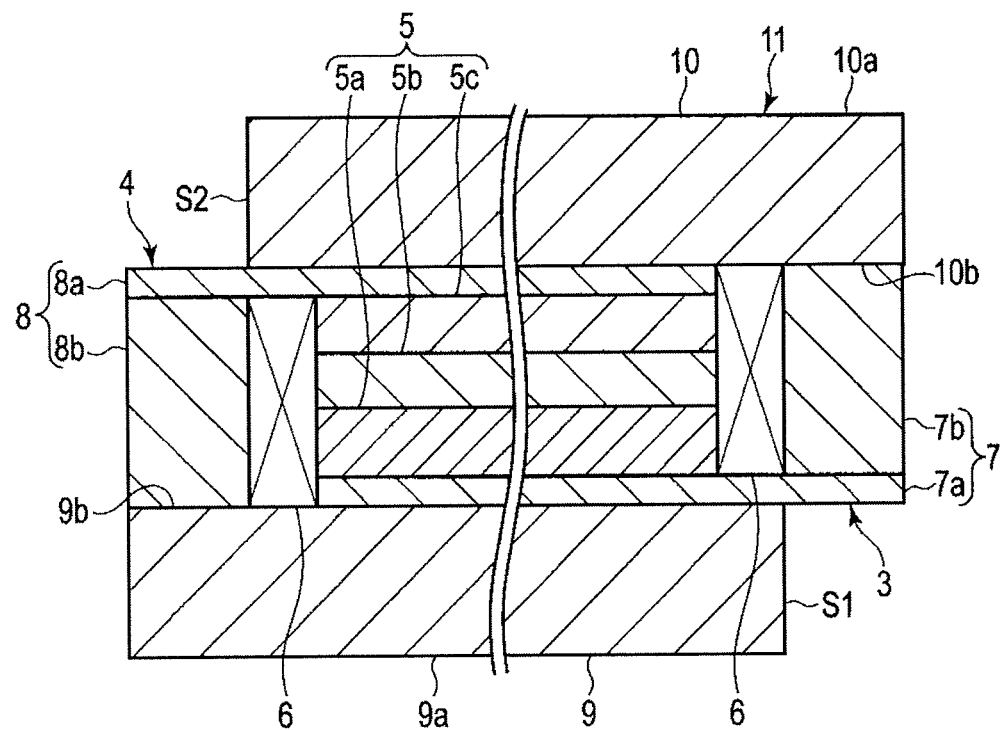
FIG. 15 is a sectional view of the electrochromic element according to a second modification according to the second embodiment.

FIG. 15 is a sectional view of the electrochromic element 11 that is a main component of the electrochromic device 1 (refer to FIG. 1) according to the second modification. In this modification, a pair of the electrode taking-out parts 3 and 4 are exposed to the outside through both supports (that is, the first support 9 and the second support 10).

As one example, in FIG. 15, the first penetration structure S1 extends by penetrating the outer surface 9a to the inner surface 9b of the other support (that is, the first support 9). The second penetration structure S2 extends by penetrating from the outer surface 10a to the inner surface 10b of one of the supports (that is, the second support 10). In this modification, other configurations other than the configuration described below and the actions and the effects are the same as the second embodiment described above and thus the description of other configurations will be omitted.

The first penetration structure S1 reaches one of the electrode parts (for example, the first electrode part 7) while avoiding the other electrode part (for example, the second electrode part 8). In this case, a part of the first support 9 is removed by the first penetration structure S1. In this configuration, a part of the first electrode part 7 is exposed to the outside and extends in a plane shape. Thus, the first electrode taking-out part 3 is electrically connected to the first electrode part 7.

The second penetration structure S2 reaches the other electrode part (for example, the second electrode part 8) while avoiding one of the electrode parts (for example, the first electrode part 7). In this case, a part of the second support 10 is removed by the second penetration structure S2. In this configuration, a part of the second electrode part 8 is exposed to the outside and extends in a plane shape. Thus, the second electrode taking-out part 4 is electrically connected to the second electrode part 8.

"Third Modification"

Figure 16:
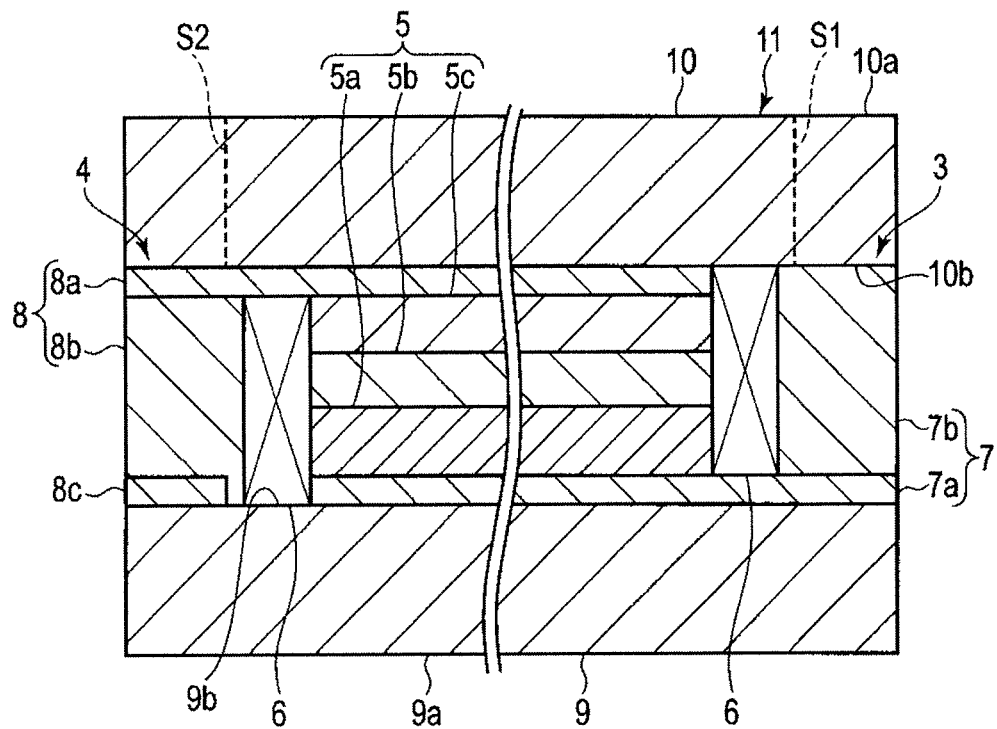
FIG. 16 is a sectional view of the electrochromic element according to a third modification according to the second embodiment.

FIG. 16 is a sectional view of the electrochromic element 11 that is a main component of the electrochromic device 1 (refer to FIG. 1) according to the third modification. This modification is a state before the penetration structures S1 and S2 are configured (that is, before the second support 10 is removed from the cut part). In this case, a planar electrode 8c is added in contact with the second contact layer 8b. The planar electrode 8c is formed as a film at the same time as the first electrode layer 7a and is not connected to the first electrode layer 7a.

The second electrode layer 8a is formed as a film on the second support 10. At the time of removing the support 10, it is highly possible that the second electrode layer 8a is removed together with the part of the removed support 10. As a configuration for avoiding this problem, the cut part S2 is located outside from the adhesion layer 6 and the second contact layer 8b surely remains unremoved after the removal of the support 10, whereby the second contact layer 8b is electrically contacted to the second electrode layer 8a through the planar electrode 8c on the first support 9.

Figure 17:
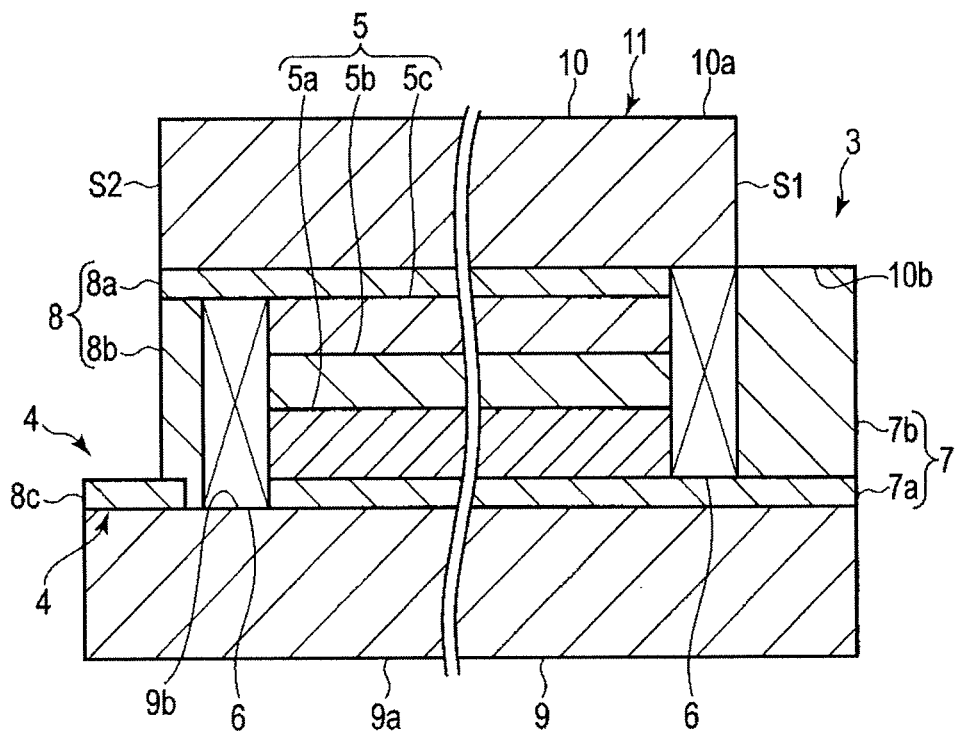
FIG. 17 is a sectional view of the electrochromic element of FIG. 16 after removing a support.

FIG. 17 is a sectional view of the electrochromic element 11 of FIG. 16 after removing the support. As illustrated in FIG. 17, if the second electrode layer 8a is removed together with the removal part of the support 10, the second contact layer 8b can surely remain unremoved. This allows the second contact layer 8b to be electrically contacted to the second electrode layer 8a through the planar electrode 8c on the first support 9 and, as a result, the electrode parts 7 and 8 to be exposed from the electrode taking-out parts 3 and 4 in a plane shape.

(Example)

Hereinafter, the present invention will be described with reference to Example. The present invention, however, is not limited to Example. In this Example, the case where the photochromatic lens unit 1 (the electrochromic device) illustrated in FIG. 10 to FIG. 12D is produced is assumed.

"Forming First Electrode Layer 7a and Electrochromic Layer 5a in First Electrode Part 7"

First, an oval polycarbonate substrate having a maximum long axis length of 75.5 mm, a maximum short axis length of 54 mm, and a thickness of 0.3 mm was prepared as the first support 9. On the first support 9, an ITO film having a thickness of about 100 nm was formed by a sputtering method to form the first electrode layer 7a.

Subsequently, a titanium oxide nano-particle dispersion liquid (trade name: SP210, manufactured by Showa Titanium Co., Ltd., average particle diameter: 20 nm) was applied on the surface of the ITO film by a spin coating method and the coated dispersion liquid was subjected to annealing treatment at 120° C. for 15 minutes to form a nano-structure semiconductor material having a thickness of about 1.0 μm and made of the titanium oxide particle film.

Subsequently, a 2,2,3,3-tetrafluoropropanol solution including 1.5% by mass of the electrochromic compound represented by the following structural formula (A) was applied by the spin coting method and the applied solution was subjected to annealing treatment at 120° C. for 10 minutes to form the electrochromic layer 5a that is supported on (adsorbed to) the titanium oxide particle film described above.

[Chemical Formula 2]

Subsequently, on the electrochromic layer 5a, a $SiO_2$ fine particle dispersion liquid (silica solid content concentration 24.8% by mass, polyvinyl alcohol 1.2% by mass, and water 74% by mass) having an average primary particle diameter of 20 nm was applied by spin-coating to form an insulating inorganic fine particle layer having a thickness of 2 μm.

"Forming Second Electrode Layer 8a in Second Electrode Part 8"

A polycarbonate substrate having the same shape and the same thickness as the first support 9 was prepared as the second support 10. In the second support 10, the slit-like penetration structures S1 and S2 (refer to FIG. 11) were previously provided. On the second support 10, an ITO film having a thickness of about 100 nm was formed by a sputtering method to form the second electrode layer 8a.

"Forming Adhesion Layer 6"

Subsequently, an optical transparent adhesive sheet (trade name: LA-50, manufactured by Nitto Denko Corporation) was processed into the shape illustrated in FIG. 11 and thereafter the processed sheet was bonded using a laminating device onto the first support 9 on which the first electrode layer 7a and the electrochromic layer 5a were formed.

"Forming Contact Layers 7b and 8b in Electrode Parts 7 and 8"

Subsequently, a conductive paste (Dotite XA-910, manufactured by FUJIKURA KASEI CO., LTD.) was applied on the first support 9 on which the first electrode layer 7a, the electrochromic layer 5a, and the adhesion layer 6 were formed at a position illustrated in FIG. 11 using a dispensing device.

"Forming Electrolyte Layer 5b and Deterioration Prevention Layer 5c and Bonding Supports 9 and 10 Together"

Subsequently, onto the surface of the insulating inorganic fine particle layer on the first support 9, a solution in which polyethylene glycol diacrylate (PEG 400DA, manufactured by Nippon Kayaku Co., Ltd.), a photopolymerization initiator (IRG 184, manufactured by BASF SE), and an electrolyte (1-ethyl-3-methylimidazolium salt) were mixed in a mass ratio of 100:5:40 was applied using a dispensing device and the resultant product was bonded together with the second support 10 using a vacuum laminating device. The resultant product was cured by ultraviolet rays (UV) to form the electrolyte layer 5b. In addition, the deterioration prevention layer 5c was formed on the formed electrolyte layer 5b.

By the above processes, the electrochromic element 11 before thermoforming illustrated in FIG. 10 and FIG. 11 was prepared.

"3D Thermoforming"

The prepared electrochromic element 11 was sandwiched between a concave mold and a convex mold having a curvature radius of about 130 mm while the molds were being heated at 146° C. to form the electrochromic element 11 of Example 1 having a 3D spherical surface shape (refer to FIG. 12B).

The maximum long axis length of the support on the curved surface of the electrochromic element 11 after the thermoforming was 76 mm. The maximum long axis length of the support in the curved surface of the electrochromic element 11 after the thermoforming relative to the maximum long axis length of the support in the plane of the electrochromic element 11 before the thermoforming was (76 mm/75.5 mm)×100=100.7%.

"Adhesion Forming Optical Lens 12"

Using a polycarbonate resin Iupilon CLS 3400 (manufactured by Mitsubishi Engineering-Plastics Corporation) as the material of the optical lens 12 adhering to the electrochromic element 11 after the thermoforming, the electrochromic element 11 was inserted into a mold and a lens-shape product was integrally formed by injection molding (refer to FIG. 12C). Thus, the electrochromic device 1 including the electrochromic element 11 and the optical lens 12 was formed by sheet insert injection mold.

"Processing of Optical Lens 12 and Electrochromic Device 1 and Exposure of Contact Part"

Thereafter, the surface of the optical lens 12 formed by adhering to the electrochromic device 1 was processed by cutting, allowing the surface of the optical lens 12 to have a curvature. Furthermore, the electrochromic device 1 (the electrochromic element 11 and the optical lens 12) was subjected to cutting and the lens shape processing was carried out so that the electrochromic device 1 was processed to a size fitted in a spectacle frame.

At this time, the electrochromic device 1 was formed into a predetermined profile along the processing line 13 (refer to FIG. 12D). The parts P1 and P2 of the second support 10 surrounded by the processing line 13 and the first penetration structure S1 (the slit) were removed. This allowed a pair of the electrode taking-out parts 3 and 4 in which parts of the electrode parts 7 and 8 extend along the outer surface 10*a* of the second support 10 in a plane shape to be configured.

"Form of Penetration Structures S1 and S2"

In the embodiment described above, as the penetration structures S1 and S2, the cut parts (the slits) extending by penetrating from the outer surfaces 9*a* and 10*a* to the inner surfaces 9*b* and 10*b* of the supports 9 and 10 are assumed. The penetration structures S1 and S2, however, are not limited thereto and may be cut parts that extend without penetration (a non-penetrating deep groove with a bottom). Even with the non-penetrating cut parts, parts of the supports 9 and 10 can be removed using the cut parts as boundaries. This allows the electrode taking-out parts 3 and 4 formed by exposing parts of the electrode parts 7 and 8 in a plane shape to be configured.

"Driving Color Development and Reduction"

The color development and reduction of the prepared photochromatic lens unit 1 (the electrochromic device) was confirmed. Specifically, voltage is applied between the first electrode part 7 (the first electrode layer 7*a*) and the second electrode part 8 (the second electrode layer 8*a*) through the electrode taking-out parts 3 and 4 exposed to the outer surface 10*a* of the second support 10 in a plane shape by the lens shape processing. At this time, a voltage of −3.5 V was applied for 3 seconds so that the first electrode layer 7*a* acted as a negative electrode. By this operation, stable color development of the photochromatic lens unit 1 (the electrochromic device) in a magenta color derived from the electrochromic compound represented by the above structural formula (A) was confirmed.

According to an embodiment, the electric connection can be more stabilized.

The present disclosure includes an aspect summarized as follows:

An electrochromic element includes:

an intermediate part including an electrochromic layer;

a pair of electrode parts adjacently arranged on both sides of the intermediate part;

a pair of supports arranged on both sides of the pair of electrode parts; and a pair of electrode taking-out parts each electrically connected to one of the pair of electrode parts, wherein in a support, the support is penetrated or cut parts are formed toward the electrode taking-out parts.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An electronic lens comprising:
an intermediate part including an electronic functional layer;
a pair of electrode layers adjacently arranged on both sides of the intermediate part in a thickness direction;
a pair of supports arranged on both sides of the pair of electrode layers in a thickness direction and having inner surfaces adjacent to the electrode layers;
a pair of contact layers electrically connected to the pair of electrode layers respectively, at least one of the pair of contact layers made of a conductive material having a thickness equal to or larger than a thickness of the electronic functional layer and being stacked between one of the electrode layers and one of the supports on another side of the electronic function layer, and the at least one of the contact layers being disposed in a position outside the electronic functional layer in a width direction; and
a pair of taking-out electrode parts including electrode taking-out parts each extending in a plane shape along an outer surface of a same or different one of the supports and each of the taking-out electrode parts electrically connected to one of the pair of electrode layers, wherein
one of the taking-out electrode parts has a first penetration structure in which the one of the taking-out electrode parts penetrates and extends from the outer surface to at least an inner surface of one of the supports and reaches one of the electrode layers while avoiding the other of the electrode layers and the other of the taking-out electrode parts, and
the other of the taking-out electrode parts has a second penetration structure in which the other of the taking-out electrode parts penetrates and extends from the outer surface to the inner surface of one of the supports and reaches the other of the electrode layers while avoiding the one of the electrode layers and the one of the taking-out electrode parts,
wherein the pair of electrodes are transparent and the pair of supports are transparent,
wherein the electronic functional layer comprises an electrochromic layer, and
wherein the electrochromic layer is capable of changing light transparency between the pair of electrode taking-out parts, and an oxidation-reduction reaction reversibly occurs so that color changes reversibly in response to applying voltage between the pair of electrode layers through the pair of electrode taking-out parts.

2. The electronic lens according to claim 1, wherein
each of the first penetration structure or the second penetration structure is a through hole penetrating at least one of the supports, and
a conductive material filled in the through hole extends along the outer surface of the one of the supports in the plane shape to form each of the electrode taking-out parts.

3. A method for producing the electronic lens according to claim 1, the method comprising: providing one of the electrode layers on the inner surface of one of the supports; providing the other of the electrode layers on the inner surface of the other of the supports; providing the intermediate part to intervene between the electrode layers; bonding the supports with the intermediate part interposed between the supports; and providing the pair of taking-out electrode parts including the electrode taking-out parts each extending in the plane shape along the outer surface of one of the supports and each of the taking-out electrode parts electrically connected to one of the pair of electrode layers.

4. The method for producing the electronic lens according to claim 3, wherein each of the first penetration structure or the second penetration structure is a through hole penetrating at least one of the supports, and a conductive material filled in the through hole extends along the outer surface of the one of the supports in the plane shape to form each of the electrode taking-out parts.

* * * * *